(12) United States Patent
Han et al.

(10) Patent No.: US 11,884,752 B2
(45) Date of Patent: Jan. 30, 2024

(54) INHIBITED NON-PREGELATINIZED GRANULAR STARCHES

(71) Applicant: Tate & Lyle Solutions USA LLC, Hoffman Estates, IL (US)

(72) Inventors: Xian-Zhong Han, Huntley, IL (US); Thomas K. Hutton, Lafayette, IN (US)

(73) Assignee: Tate & Lyle Solutions USA LLC, Hoffman Estates, IL (US)

( * ) Notice: Subject to any disclaimer, the term of this patent is extended or adjusted under 35 U.S.C. 154(b) by 0 days.

(21) Appl. No.: 17/495,327

(22) Filed: Oct. 6, 2021

(65) Prior Publication Data

US 2022/0110354 A1   Apr. 14, 2022

Related U.S. Application Data

(63) Continuation of application No. 16/579,009, filed on Sep. 23, 2019, now Pat. No. 11,166,483, which is a continuation of application No. 13/887,630, filed on May 6, 2013, now Pat. No. 10,463,066.

(60) Provisional application No. 61/810,545, filed on Apr. 10, 2013, provisional application No. 61/647,146, filed on May 15, 2012.

(51) Int. Cl.
  *C08B 30/12* (2006.01)
  *A23L 29/219* (2016.01)

(52) U.S. Cl.
  CPC ............ *C08B 30/12* (2013.01); *A23L 29/219* (2016.08)

(58) Field of Classification Search
  None
  See application file for complete search history.

(56) References Cited

U.S. PATENT DOCUMENTS

| | | |
|---|---|---|
| 2,124,272 A | 7/1938 | Ellis |
| 2,587,650 A | 3/1952 | Rist et al. |
| 3,130,081 A | 4/1964 | Evans |
| 3,264,283 A | 8/1966 | Jarowenko et al. |
| 3,399,081 A | 8/1968 | Bernetti et al. |
| 3,563,798 A | 2/1971 | Germino et al. |
| 3,578,498 A | 5/1971 | Kite et al. |
| 3,586,536 A | 6/1971 | Germino et al. |
| 3,617,383 A | 11/1971 | Thurston et al. |
| 3,977,897 A | 8/1976 | Wurzburg et al. |
| 4,256,509 A | 3/1981 | Tuschhoff et al. |
| 4,452,978 A | 6/1984 | Eastman |
| 4,465,702 A | 8/1984 | Eastman et al. |
| 4,477,480 A | 10/1984 | Seidel et al. |
| 4,634,596 A | 1/1987 | Eastman |
| 5,057,157 A | 10/1991 | Jane et al. |
| 5,593,503 A | 1/1997 | Shi et al. |
| 5,718,770 A | 2/1998 | Shah et al. |
| 5,725,676 A | 3/1998 | Chiu et al. |
| 5,902,410 A | 5/1999 | Chiu et al. |
| 5,932,017 A | 8/1999 | Chiu et al. |
| 6,010,574 A | 1/2000 | Jeffcoat et al. |
| 6,221,420 B1 | 4/2001 | Thomas et al. |
| 6,231,675 B1 | 5/2001 | Chiu et al. |
| 6,277,186 B1 | 8/2001 | Shi et al. |
| 6,451,121 B2 | 9/2002 | Chiu et al. |
| 7,189,288 B2 | 3/2007 | Stanley et al. |
| 2001/0017133 A1 | 8/2001 | Chiu et al. |
| 2004/0151767 A1 | 8/2004 | Okoniewska et al. |

*Primary Examiner* — Jyoti Chawla
(74) *Attorney, Agent, or Firm* — McDonnell Boehnen Hulbert & Berghoff LLP

(57) ABSTRACT

An inhibited non-pregelatinized granular starch suitable for use as a food ingredient in substitution for a chemically modified starch may be prepared by heating a non-pregelatinized granular starch in an alcoholic medium in the presence of a base and/or a salt. Steam treatment may be used to enhance the extent of inhibition.

14 Claims, 27 Drawing Sheets

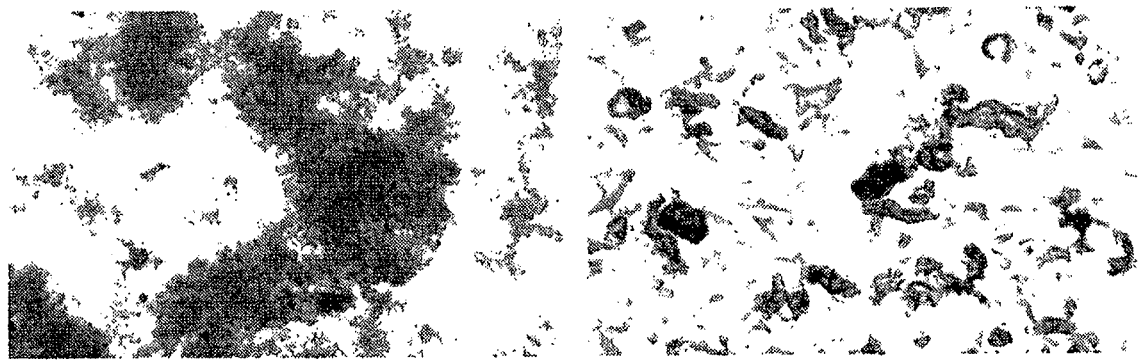
Sample 1-D, after RVA at pH 6.5       Sample 1-A, after RVA at pH 6.5
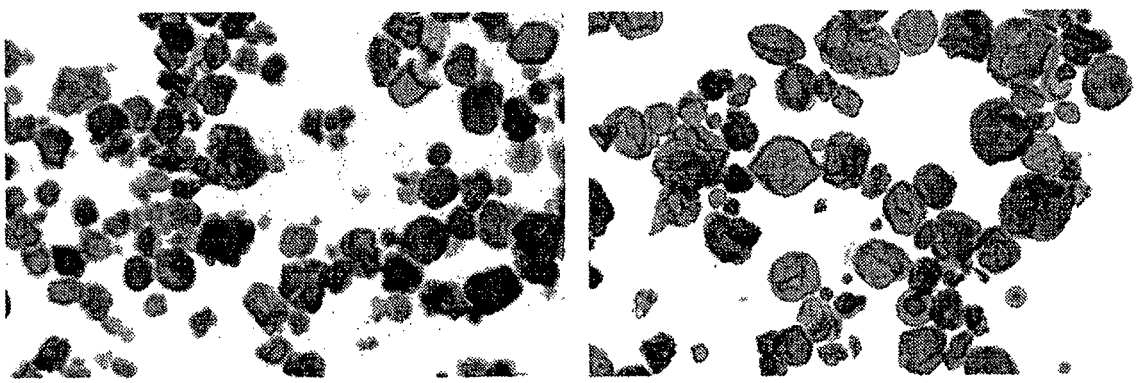
Sample 1-B, after RVA at pH 6.5       Sample 1-C, after RVA at pH 6.5
FIGURE 2

Sample 1-D, after RVA at pH 3.5
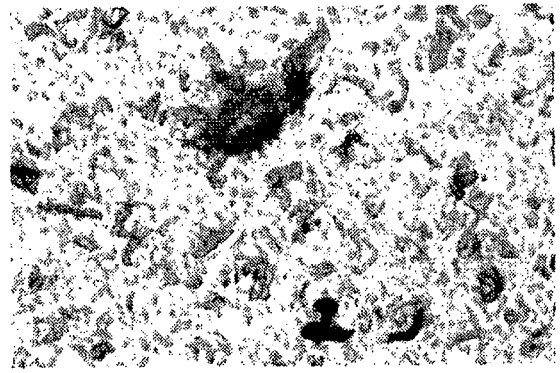
Sample 1-A, after RVA at pH 3.5
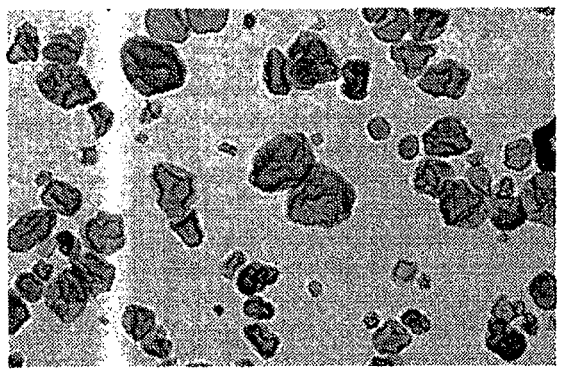
Sample 1-B, after RVA at pH 3.5
Sample 1-C, after RVA at pH 3.5
FIGURE 4

Sample 1-D, after retort simulation
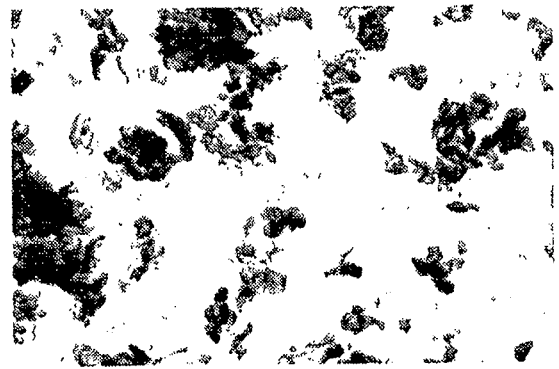
Sample 1-A, after retort simulation
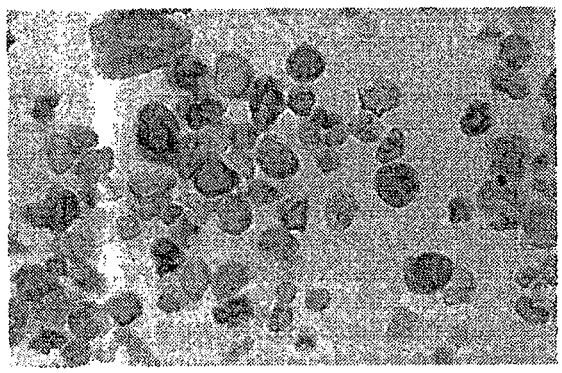
Sample 1-B, after retort simulation
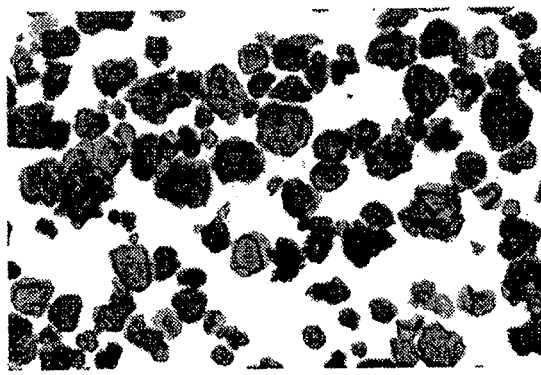
Sample 1-C, after retort simulation
FIGURE 5

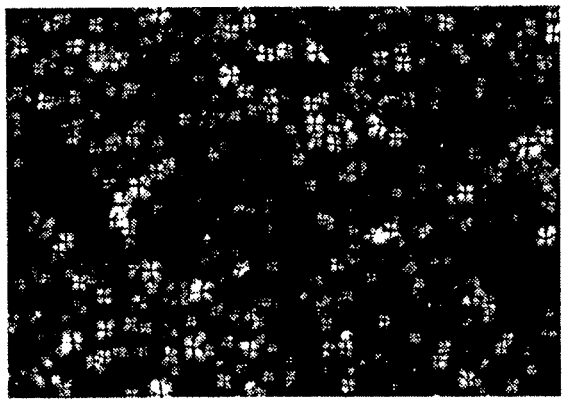
Sample 1-D
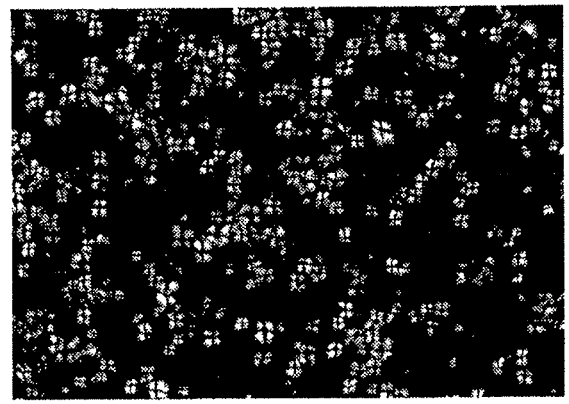
Sample 1-A
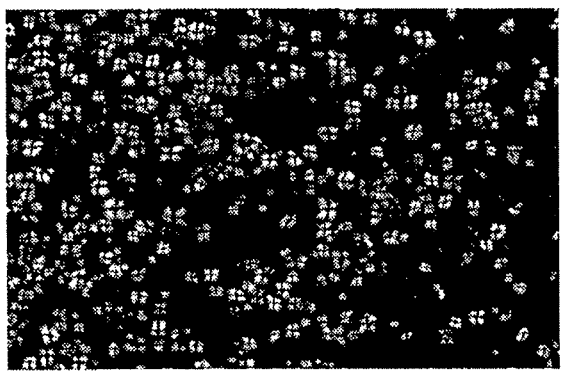
Sample 1-B
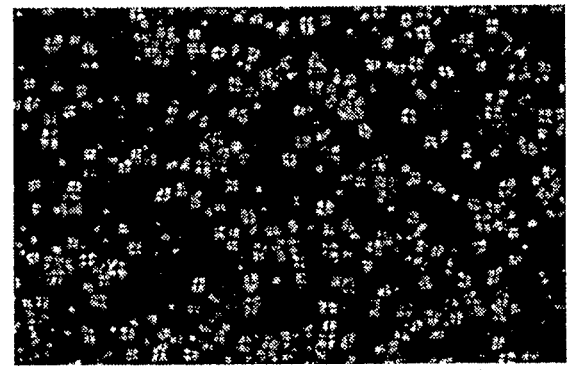
Sample 1-C
FIGURE 6

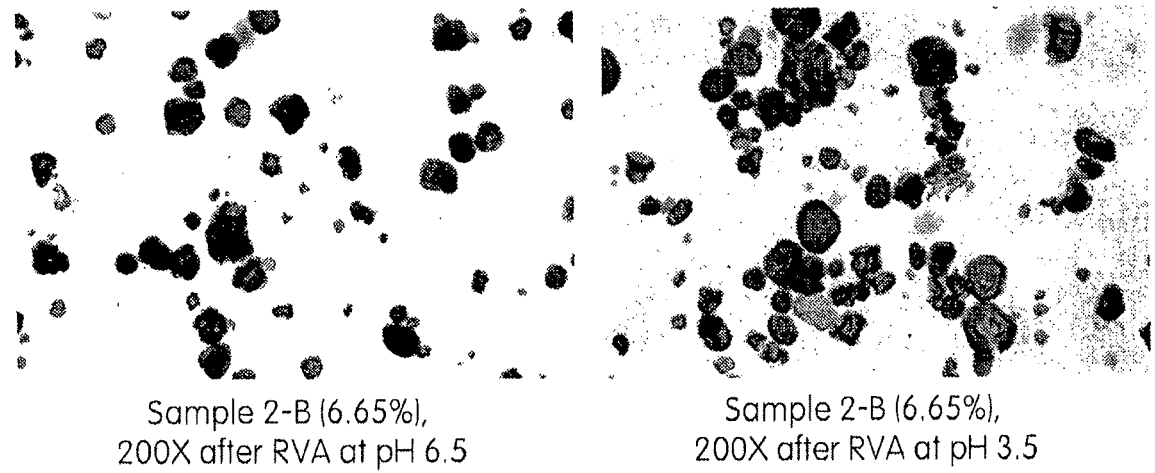
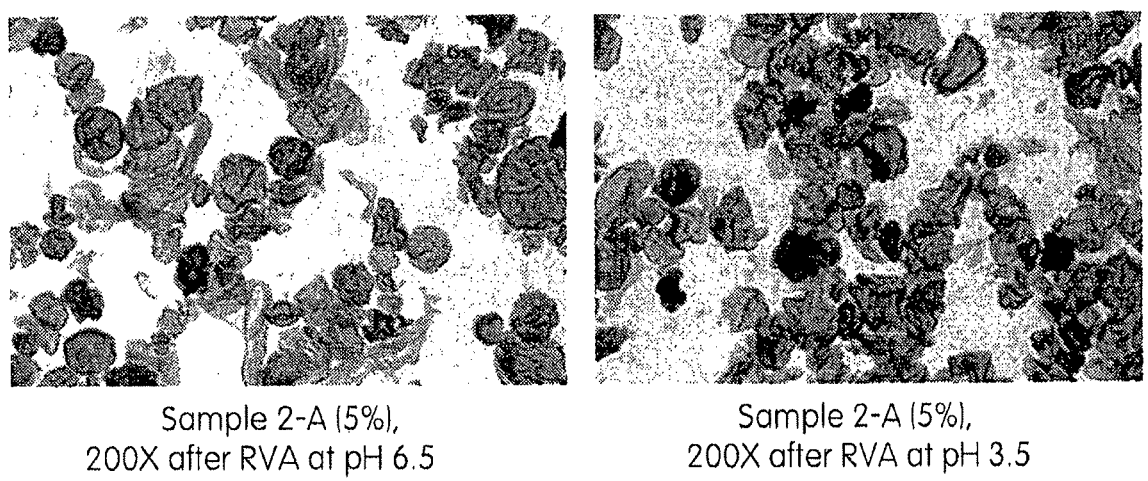
FIGURE 12

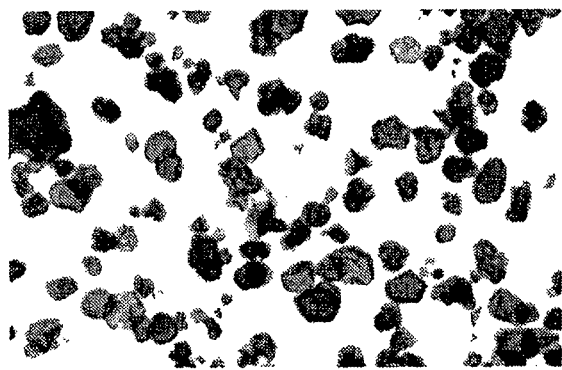
Sample 2-D (5%),
200X after RVA at pH 6.5
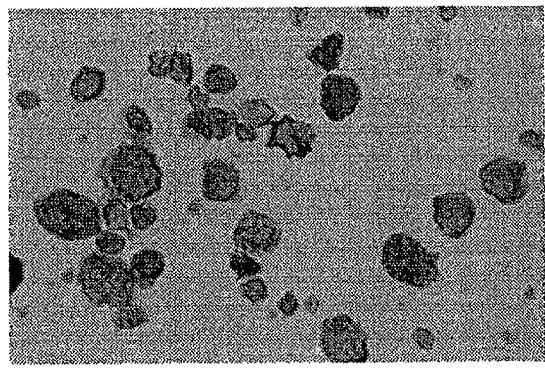
Sample 2-D (6.65%),
200X after RVA at pH 3.5
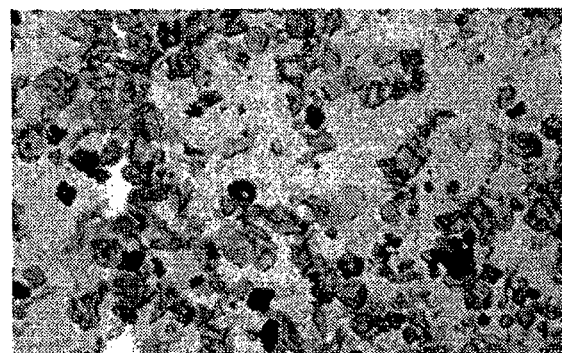
Sample 2-C (5%),
100X after RVA at pH 6.5
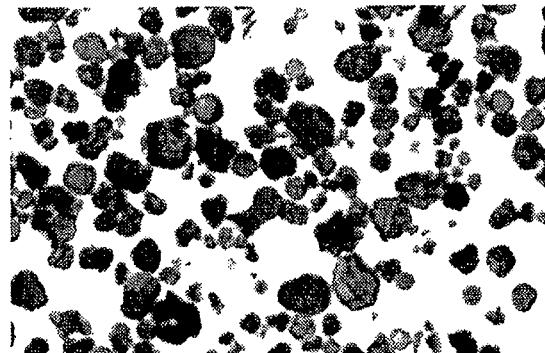
Sample 2-D (7.5%),
200X after retort simulation
FIGURE 13

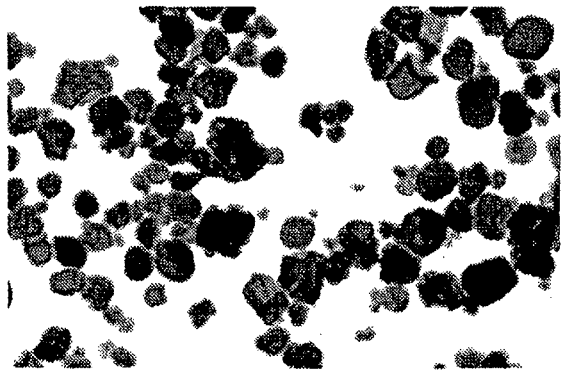 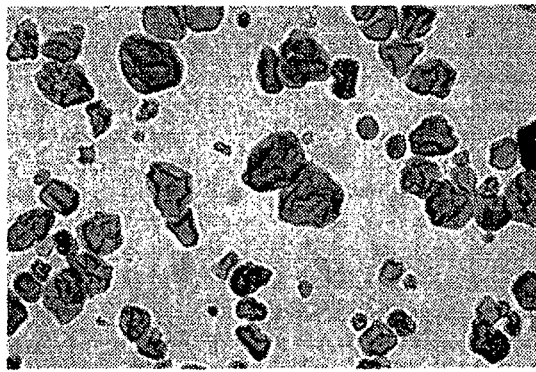
Sample 2-F (5%), 200X after RVA at pH 6.5
Sample 2-F (6.65%), 200X after RVA at pH 3.5
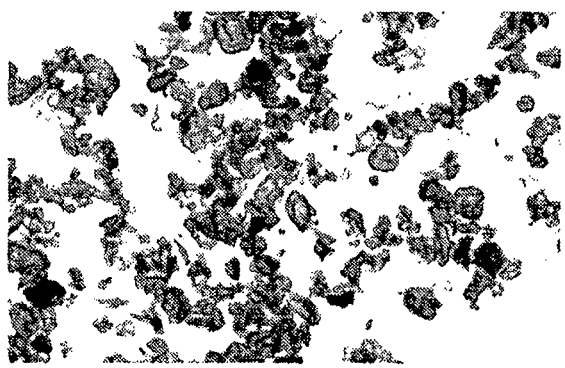 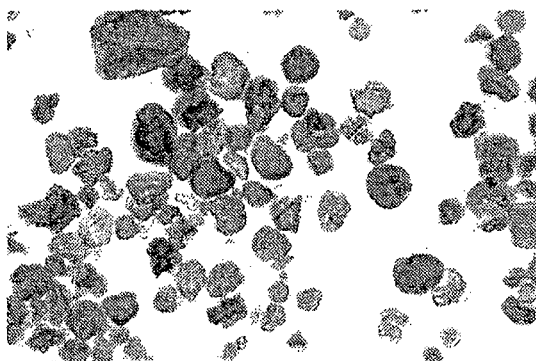
Sample 2-E (5%), 100X after RVA at pH 6.5
Sample 2-F (6.65%), 200X after retort simulation
FIGURE 14

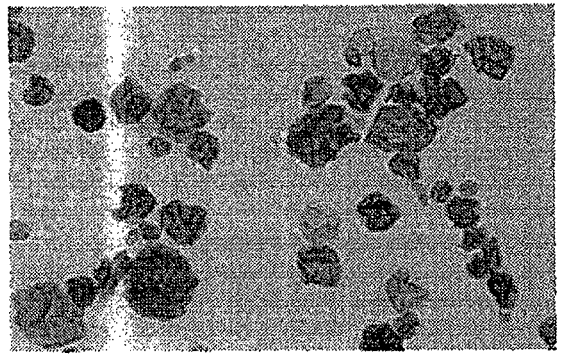
Sample 2-H (6.65%),
200X after RVA at pH 6.5
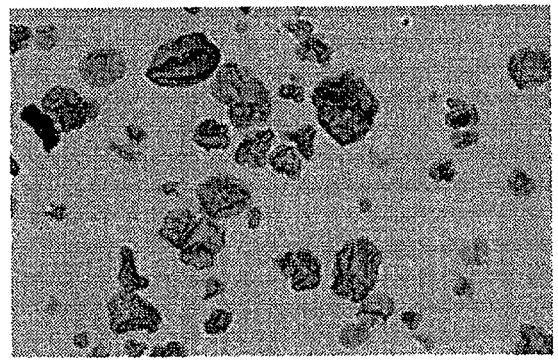
Sample 2-H (6.65%),
200X after RVA at pH 3.5
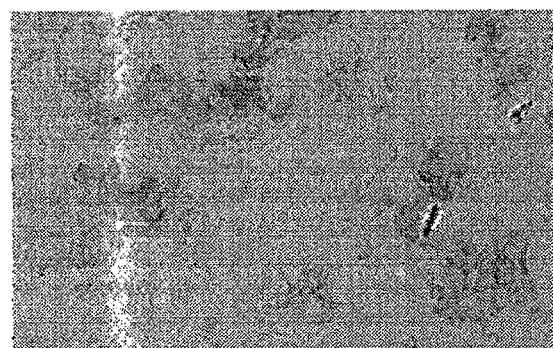
Sample 2-G (6.65%),
200X after RVA at pH 6.5
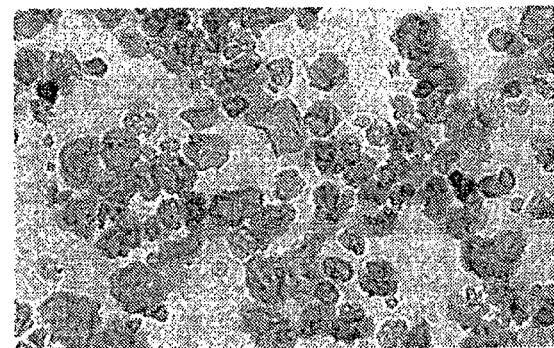
Sample 2-H (6.65%),
200X after retort simulation
FIGURE 15

Figure 18. Sample 7629-68 that has been cooked in 1% NaCl solution before shearing Figure 19. Sample 7629-68 that has been cooked in 1% NaCl solution and sheared using a blender at 25 Volts for 20 sec Figure 20. Sample 7629-68 desolventized at 125°C for 4 hours that has been cooked in 1% NaCl solution before shearing Figure 21. Sample 7629-68 desolventized at 125°C for 4 hours that has been cooked in 1% NaCl solution and sheared using a blender at 25 Volts for 20 sec Figure 22. Sample 7629-68 desolventized at 125°C for 4 hours illuminated with polarized light and observed using a microscope Figure 23. Sample 7629-68 desolventized at 160°C for 4 hours illuminated with polarized light and observed using a microscope Figure 25. Sample 7629-70 desolventized at 125°C for 4 hours that has been cooked in 1% NaCl solution before shearing
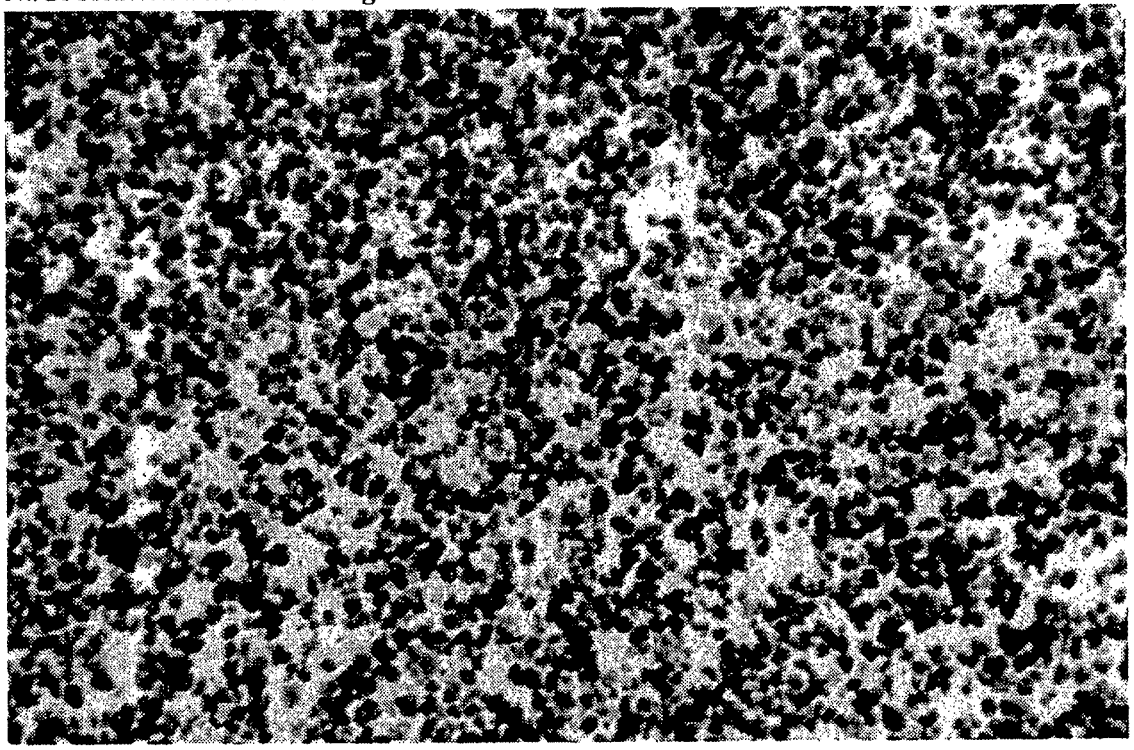

Figure 26. Sample 7629-70 desolventized at 125°C for 4 hours that has been cooked in 1% NaCl solution and sheared using a blender at 25 Volts for 20 sec
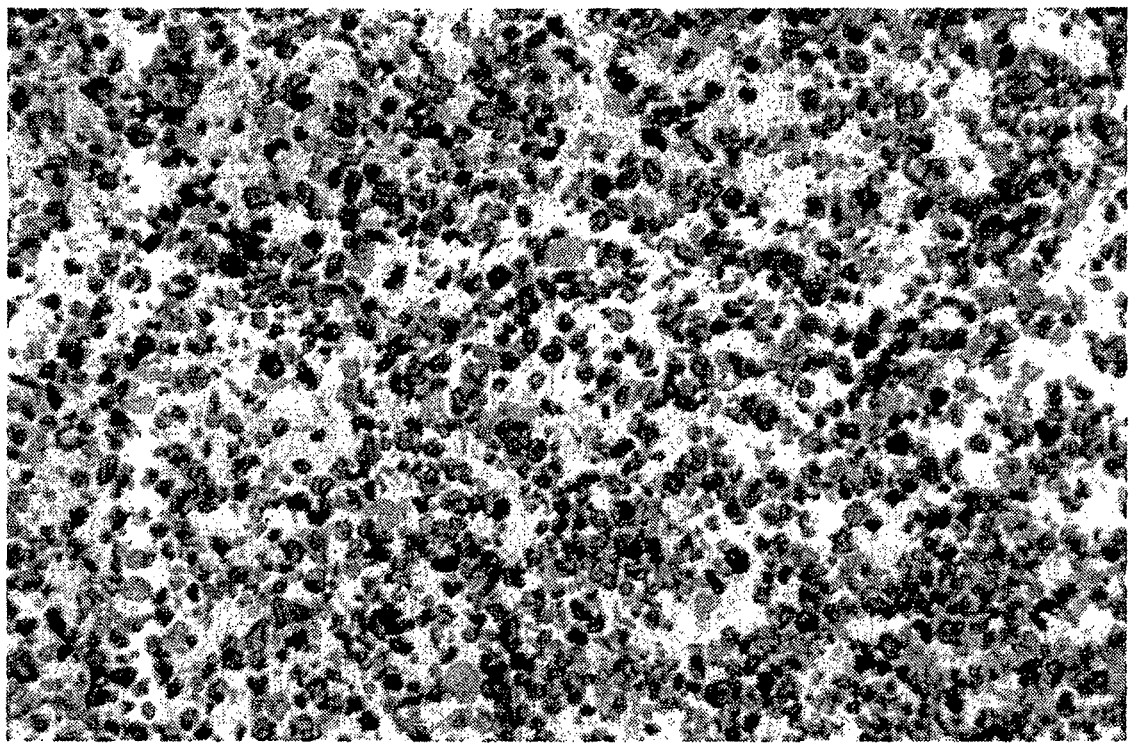

Figure 27. Sample 7629-70 desolventized at 125°C for 4 hours illuminated with polarized light and observed using a microscope
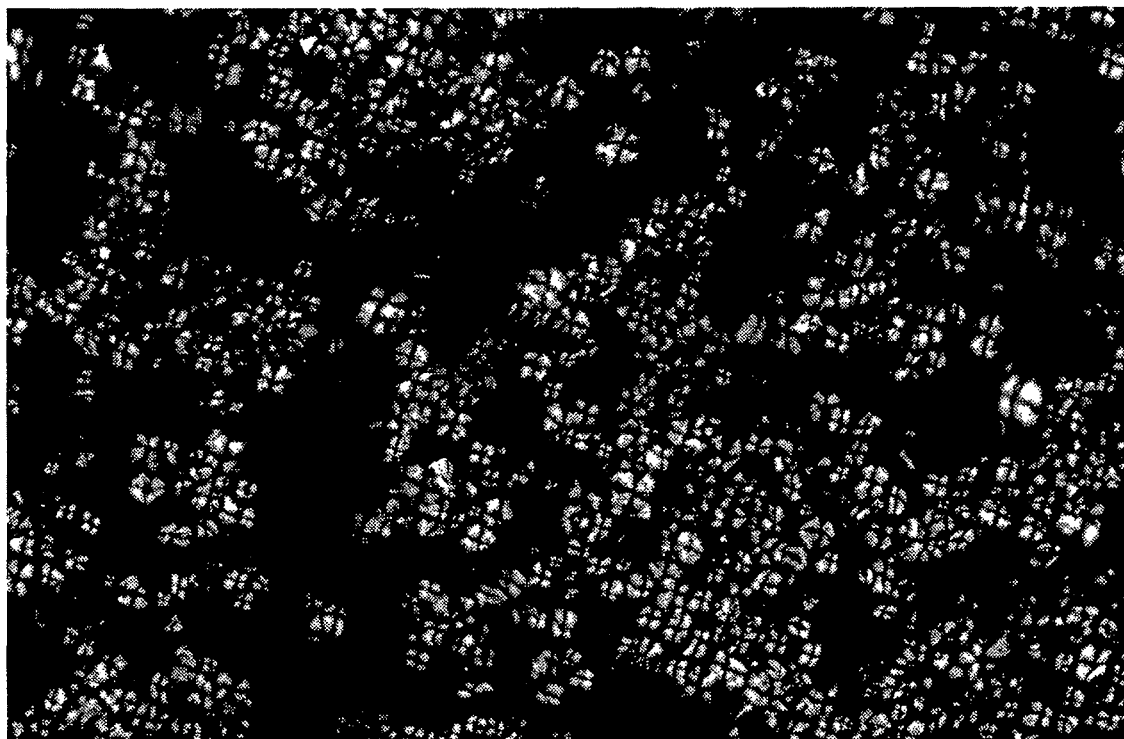

INHIBITED NON-PREGELATINIZED GRANULAR STARCHES

CROSS REFERENCE TO RELATED APPLICATION

This application is a continuation application of U.S. patent application Ser. No. 16/579,009, filed Mar. 23, 2019, which is a continuation application of U.S. patent application Ser. No. 13/887,630, filed May 6, 2013, now issued as U.S. Pat. No. 10,463,066, which claims the benefit of priority of U.S. Provisional Patent Application Nos. 61/647,146, filed May 15, 2012, and 61/810,545, filed Apr. 10, 2013, all of which are hereby incorporated by reference in their entirety.

FIELD OF THE INVENTION

The invention relates to the production of inhibited non-pregelatinized granular starches which are useful as ingredients in food compositions.

BACKGROUND OF THE RELATED ART

A recent trend in the food industry has been growing consumer demand for so-called "clean-labelled" or non-chemically modified ingredients. In applications where it is desired to thicken a food product such as a soup or sauce which is to be subjected to severe acid and/or heat and/or shear conditions during either its processing or its end use, chemically modified starches have traditionally been used since such starches are remarkably tolerant of such extreme conditions. These chemically modified starches are produced by various crosslinking techniques wherein a chemical reagent is used to form crosslinks in the starch and thereby alter its viscosity and stability characteristics at elevated temperatures. However, it would be desirable to develop replacements for such chemically modified starches which exhibit similar performance and yet would not be regarded or classified as chemically modified for labelling purposes.

SUMMARY OF THE INVENTION

The invention provides a method for making an inhibited non-pregelatinized granular starch, wherein the method comprises heating a non-pregelatinized granular starch in an alcoholic medium in the presence of at least one treatment agent selected from the group consisting of bases and salts at a temperature of at least 35° C.

In another aspect, the invention provides a method for making an inhibited non-pregelatinized granular starch, wherein the method comprises:
  a) heating a non-pregelatinized granular starch in an alcoholic medium in the presence of a base at a temperature of at least 35° C.;
  b) neutralizing the base with an acid;
  c) separating the inhibited non-pregelatinized granular starch from the alcoholic medium; and
  d) removing alcohol solvent from the inhibited non-pregelatinized granular starch by heating.

The alcoholic medium may be comprised of a C1-C4 alcohol (e.g., ethanol). In another embodiment, the alcoholic medium is comprised of 0 to 20 weight percent water. In one embodiment, the alcoholic medium is basic. In another embodiment, the alcoholic medium is neutral. The temperature in step a) may, in one embodiment, be at least 120° C. The heating in step a) may, for example, be carried out for a period of time of from 5 minutes to 20 hours. The treatment agent may, for example, be a base selected from the group consisting of alkali metal hydroxides, alkali metal carbonates (in particular, sodium carbonate), alkali metal phosphates, ammonium phosphates, alkaline earth carbonates and alkaline earth hydroxides. The treatment agent may include a polycarboxylic acid salt. The polycarboxylic acid salt may, for example, be a sodium or potassium salt of a polycarboxylic acid. The treatment agent in one embodiment includes one or more sodium salts of citric acid. The treatment agent may be present in an amount of not more than 10 weight percent based on the weight of the non-pregelatinized granular starch and/or may be present in an amount of at least 0.2 weight percent based on the weight of the non-pregelatinized granular starch. The method may comprise an additional step of removing alcohol solvent from the inhibited non-pregelatinized granular starch. The method may comprise an additional step of separating the inhibited non-pregelatinized granular starch from the alcoholic medium and heating the separated inhibited non-pregelatinized granular starch. The heating of the separated inhibited non-pregelatinized granular starch, in one embodiment, is conducted at a temperature of at least 120° C. The method may comprise an additional step of treating the inhibited non-pregelatinized granular starch with steam. The non-pregelatinized granular starch utilized as a starting material may, for example, be selected from the group consisting of corn starch, pea starch, potato starch, sweet potato starch, banana starch, barley starch, wheat starch, rice starch, sago starch, amaranth starch, tapioca starch, sorghum starch, waxy maize starch, waxy pea starch, waxy wheat starch, waxy tapioca starch, waxy rice starch, waxy barley, waxy potato, waxy sorghum, starches having an amylose content of 40% or greater, and combinations thereof. In particular, the non-pregelatinized granular starch may be corn starch or a waxy starch. In one embodiment of the method, the non-pregelatinized granular starch is in the form of a slurry in the alcoholic medium and the pH of the slurry is at least 6. In another embodiment, the at least one treatment agent includes a base and the method comprises an additional step of neutralizing the base in the inhibited non-pregelatinized granular starch with an acid. The acid may, for example, be selected from the group consisting of phosphorus-containing acids, carboxylic acids, uric acid and mixtures thereof. For instance, the acid may be selected from the group consisting of citric acid, oxalic acid, malic acid, lactic acid, acetic acid and mixtures thereof. The acid may be a polycarboxylic acid. After neutralization, a further step of heating the inhibited non-pregelatinized granular starch in the alcoholic medium may be carried out. For example, the further heating of the inhibited non-pregelatinized granular starch in the alcoholic medium may be carried out at a temperature of from about 120° C. to about 200° C.

In yet another aspect, the invention provides a method for making an inhibited non-pregelatinized granular starch, wherein the method comprises:
  a) heating a slurry of a non-pregelatinized granular starch in an aqueous ethanol medium in the presence of a base at a temperature of 120° C. to 200° C.;
  b) neutralizing the base with an acid;
  c) separating the inhibited non-pregelatinized granular starch from the aqueous ethanol medium; and
  d) contacting the separated inhibited non-pregelatinized granular starch with steam at a temperature of from 100° C. to 200° C. to remove ethanol.

Following step b) and prior to step c), the neutralized slurry may be again heated, e.g., at a temperature of 120° C. to 200° C.

Also provided by the present invention is a method for making an inhibited non-pregelatinized granular starch, wherein the method comprises:
a) heating a non-pregelatinized granular starch in an alcoholic medium in the presence of a base at a temperature of at least 35° C.;
b) neutralizing the base with an acid to provide a neutralized slurry;
c) heating the neutralized slurry at a temperature of at least 35° C.;
d) separating the inhibited non-pregelatinized granular starch from the alcoholic medium; and
e) removing alcohol solvent from the inhibited non-pregelatinized granular starch by heating.

Another aspect of the present invention provides a method for making an inhibited non-pregelatinized granular starch, wherein the method comprises:
a) heating a non-pregelatinized granular starch in an alcoholic medium in the presence of a carboxylic acid salt at a temperature of at least 35° C.;
b) separating the inhibited non-pregelatinized granular starch from the alcoholic medium; and
c) removing alcohol solvent from the inhibited non-pregelatinized granular starch by heating.

The alcoholic medium may be comprised of a C1-C4 alcohol, such as ethanol. The alcoholic medium may comprise 0 to 20 weight percent water. In one embodiment, the temperature in step a) is at least 120° C. The carboxylic acid salt may, for example, be present in an amount of not more than 10 weight percent based on the weight of the non-pregelatinized granular starch. The carboxylic acid salt may, for example, be present in an amount of at least 0.2 weight percent based on the weight of the non-pregelatinized granular starch. In one embodiment, the heating of the separated inhibited non-pregelatinized granular starch in step c) is conducted at a temperature of at least 120° C. The aforementioned method may comprise a step of treating the inhibited non-pregelatinized granular starch with steam. The non-pregelatinized granular starch may, for example, be selected from the group consisting of corn starch, pea starch, potato starch, sweet potato starch, banana starch, barley starch, wheat starch, rice starch, sago starch, amaranth starch, tapioca starch, sorghum starch, waxy maize starch, waxy pea starch, waxy wheat starch, waxy tapioca starch, waxy rice starch, waxy barley, waxy potato, waxy sorghum, starches having an amylose content of 40% or greater, and combinations thereof. In particular embodiments, the non-pregelatinized granular starch is corn starch or a waxy starch. The non-pregelatinized granular starch may be in the form of a slurry in the alcoholic medium and the pH of the slurry may be from 5 to 8, in certain embodiments of the invention. The heating in step a) may, for example, be carried out for a period of time of from 5 minutes to 20 hours. The at least one carboxylic acid salt may include a polycarboxylic acid salt, such as a sodium or potassium salt of a polycarboxylic acid. In one aspect of the invention, the at least one carboxylic acid salt includes one or more sodium salts of citric acid. The at least one carboxylic acid salt may be formed in situ prior to step a) by combining at least one carboxylic acid with at least one base.

Still another aspect of the invention provides inhibited non-pregelatinized granular starches obtained in accordance with any of the above-mentioned methods.

The present invention thus enables the preparation of inhibited starches without the use of hazardous chemicals, using only food grade ingredients. Additionally, no hazardous chemicals are produced during such preparation. Starches produced in accordance with the invention can be inhibited to levels comparable to highly chemically cross-linked starches and can be used in the same applications where chemically modified starches are conventionally used. For example, inhibited starches obtained in accordance with the methods of the invention can be utilized as alternatives or substitutes for chemically modified starches where severe acid and/or heat and/or shear conditions exist or are applied.

BRIEF DESCRIPTION OF THE FIGURES

The Figures are explained in more detail in the Examples.

FIG. 2 shows micrographs of starch pastes after RVA at pH 6.5 (magnification 200×).

FIG. 4 shows micrographs of starch pastes after RVA at pH 3.5 (magnification 200×).

FIG. 5 shows micrographs of various starch pastes after retort simulation.

FIG. 6 shows micrographs of various starch samples, some of which were treated in accordance with the present invention.

FIGS. 12-15 show micrographs of starch granules in various samples of starch paste after RVA and retort simulation.

FIGS. 18, 20 and 25 show micrographs of treated starch samples cooked in 1% NaCl.

FIGS. 19, 21 and 26 show micrographs of treated starch samples cooked in 1% NaCl and then sheared using a blender.

FIGS. 22, 23 and 27 show micrographs of treated starch samples illuminated with polarized light.

DETAILED DESCRIPTION OF THE INVENTION

Figure 1:
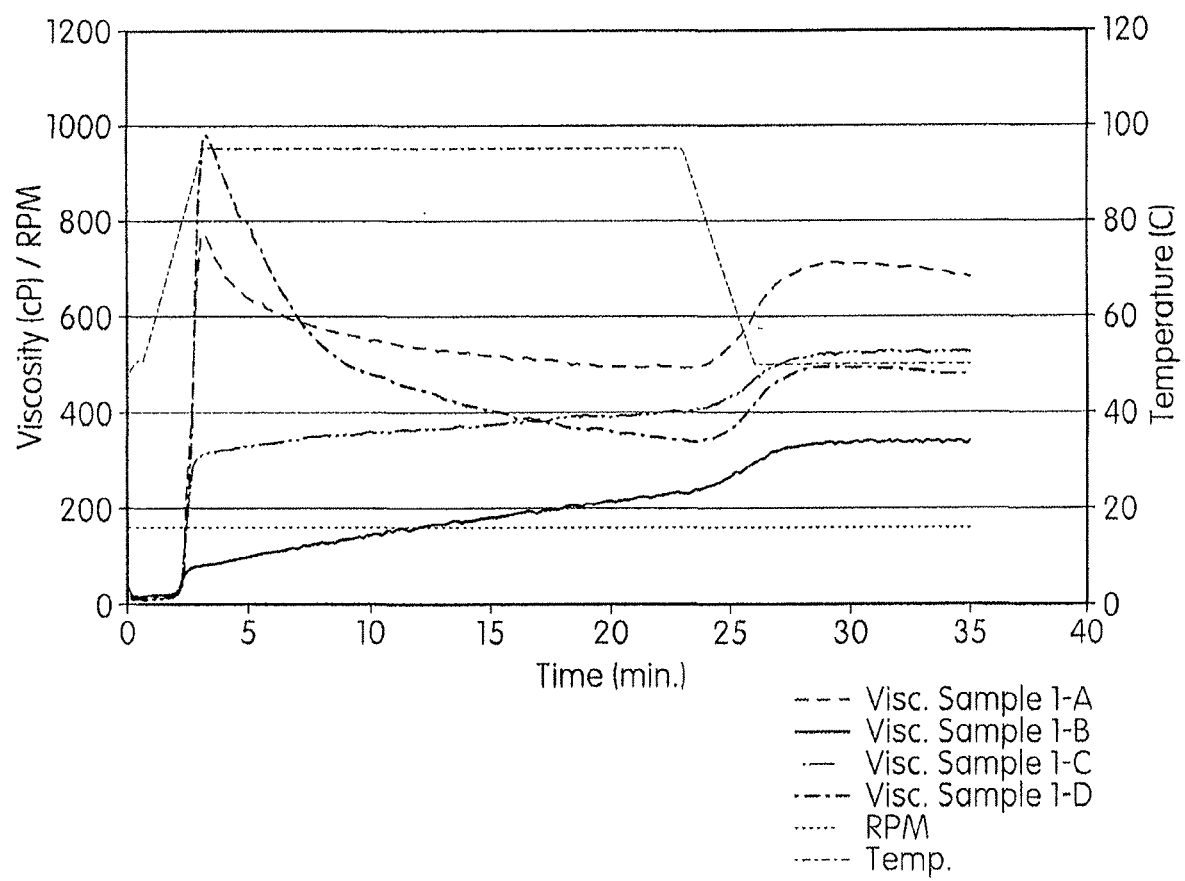
FIG. 1 shows the Rapid Visco-Analyzer (RVA) profiles (Cookup) of different starch samples measured at a 5% concentration in a pH 6.5 aqueous medium.

As used herein, the term "inhibited starch" means a starch having the characteristics of a chemically crosslinked starch. Inhibited starches may vary with respect to their degree of inhibition, as characterized by their observed viscosity and other characteristics when 5% to 6.3% dry starch in water having a pH of 3 is heated at 92° C. to 95° C. A starch that is substantially completely inhibited will resist swelling. A starch that is highly inhibited will swell to a limited extent and show a continuing rise in viscosity, but will not attain a peak viscosity. A starch that is moderately inhibited will exhibit a lower peak viscosity and a lower percentage breakdown in viscosity compared to the same starch that is not inhibited. A starch that is lightly inhibited will show a slight increase in peak viscosity, and a lower percentage breakdown in viscosity compared to control (uninhibited) starch.

All starches (including starchy flours) are suitable for use in the present invention. The starches can be derived from any native source. A "native" starch or flour is one as it is found in nature in unmodified form. Typical sources for the starches are cereals, tubers, roots, legumes and fruits. The native source can be corn, pea, potato, sweet potato, banana, barley, wheat, rice, sago, amaranth, tapioca, sorghum, waxy maize, waxy pea, waxy wheat, waxy tapioca, waxy rice, waxy barley, waxy potato, waxy sorghum, starches having an amylose content of 40% or greater and the like. In one embodiment, corn starch (in particular, waxy corn starch) is used. Mixtures of different starches may be utilized. The starch may be subjected to one or more purification and/or modification treatments prior to being heated with the alcoholic medium and treatment agent. For example, the starch may be treated to reduce the amount of lipid and/or protein present in the starch. The starch may contain some amount of moisture, e.g., up to about 15% by weight water.

The alcoholic medium generally comprises at least one alcohol, particularly a C1-C4 monoalcohol such as methanol, ethanol, n-propanol, isopropanol, n-butanol, t-butyl alcohol and the like. One or more other substances may also be present in the alcoholic medium, such as a non-alcoholic organic solvent (particularly those that are miscible with the alcohol) and/or water. However, in one embodiment of the invention the alcoholic medium does not contain any solvent other than alcohol and, optionally, water. Aqueous alcohols, for example, may be used to advantage in the process of the invention. The alcoholic medium may comprise, for instance, 30% to 100% by weight alcohol (e.g., ethanol) and from 0% to 70% by weight water. In one embodiment, the alcoholic medium contains from 80% to 96% by weight alcohol (e.g., ethanol) and from 4% to 20% by weight water, the total amount of alcohol and water equalling 100%. In another embodiment, the alcoholic medium contains 90% to 100% by weight alcohol (e.g., ethanol) and from 0% to 10% by weight water, the total amount of alcohol and water equalling 100%. In other embodiments, not more than 10% or not more than 15% by weight water is present in the alcoholic medium. The quantity of alcoholic medium relative to starch is not considered to be critical, but typically for the sake of convenience and ease of processing sufficient alcoholic medium is present to provide a stirrable and/or pumpable slurry. For example, the weight ratio of starch: alcoholic medium may be from about 1:2 to about 1:6.

In one aspect of the invention, at least some amount of treatment agent (base and/or salt) is present when the non-pregelatinized granular starch is heated in the alcoholic medium. However, an advantage of this embodiment of the present invention is that large amounts of treatment agent (relative to starch) need not be used in order to achieve effective inhibition of the starch, in contrast to previously known starch modification processes. This simplifies the subsequent processing of the inhibited starch and lowers potential production costs.

Typically, at least 0.5% by weight of treatment agent (based on the dry weight of starch used) is employed, although in other embodiments of the invention at least 1%, at least 2%, at least 3%, at least 4% or at least 5% by weight of treatment agent is present. For economic reasons, generally no more than 10% or 15% by weight of treatment agent is present.

Typically, the mixture of starch, alcoholic medium and treatment agent is in the form of a slurry. In certain embodiments of the invention, it may be desirable to adjust the pH of the slurry to a particular value. It can be difficult to measure the pH of such a slurry due to the presence of the alcohol. In an embodiment where it is desired to make the slurry basic by adding a base, a suitable amount of base can be determined as if the slurry is a slurry of starch in de-ionized water alone and then scaled up to the actual amount while keeping the same ratio of base and starch.

The slurry may, for example, be neutral (pH 6 to 8) or basic (pH greater than 8). In one embodiment, the pH of the slurry is at least 6. In another embodiment, the pH of the slurry is at least 7. The slurry pH in another embodiment is not more than 12. In other embodiments, the pH of the slurry is 6-10, 7.5-10.5 or 8-10. In still other embodiments, the pH of the slurry is 5-8 or 6-7.

The alcohol-treatment agent treatment of the starch may be effected by first placing the starch in the alcoholic medium and then adding treatment agent (e.g., base and/or salt). Alternatively, the treatment agent may be first combined with the alcoholic medium and then contacted with the starch. The treatment agent may be formed in situ, such as by separately adding a base and an acid which react to form the salt which functions as the treatment agent.

Suitable bases for use in the process of the invention include, but are not limited to, alkali metal and alkaline earth metal hydroxides such as potassium hydroxide, calcium hydroxide and sodium hydroxide, alkali metal and alkaline earth metal carbonates such as sodium carbonate, potassium carbonate, sodium bicarbonate, and calcium carbonate, alkali metal and ammonium salts of phosphorus-containing acids such as tetrasodium pyrophosphate, ammonium orthophosphate, disodium orthophosphate, and trisodium phosphate, and any other bases approved for use under the applicable regulatory laws. Strong bases as well as weak bases may be utilized.

Suitable salts for use in the process of the invention include water-soluble substances which ionize in aqueous solution to provide a substantially neutral solution (i.e., a solution having a pH of from 6 to 8). Alkali metal-containing salts are particularly useful in the present invention, as are salts of organic carboxylic acids. In one embodiment of the invention, the treatment agent includes a salt (in particular, a sodium or potassium salt) of a polycarboxylic acid such as citric acid or the like. Other suitable carboxylic acid salts include, but are not limited to, salts of acetic acid, adipic acid, itaconic acid, malonic acid, lactic acid, tartaric acid, oxalic acid, fumaric acid, aconitic acid, succinic acid, oxalosuccinic acid, glutaric acid, ketoglutaric acid, malic acid, fatty acids and combinations thereof. Sodium citrates (monosodium citrate, disodium citrate, trisodium citrate and combinations thereof) are utilized in one aspect of the present invention. Other illustrative examples of suitable carboxylic acid salts include, but are not limited to, potassium citrates, calcium citrates, sodium malate, sodium fumarate, sodium oxalate and the like and combinations thereof. In one embodiment of the invention, one or more salts capable of functioning as buffering agents are employed.

Mixtures of different treatment agents may be used in the present invention. For example, the starch may be heated in the alcoholic medium in the presence of both at least one base and at least one salt.

The starch, alcoholic medium and treatment agent are heated for a time and at a temperature effective to inhibit the starch to the desired extent. Generally speaking, temperatures in excess of room temperature (i.e., 35° C. or greater) will be necessary. At the same time, extremely high temperatures should be avoided. The heating temperature can be, for example, 35° C. to 200° C. Typically, temperatures of from 100° C. to 190° C., 120° C. to 180° C., or from 130° C. to 160° C., or from 140° C. to 150° C. will be sufficient. The heating time generally is at least 5 minutes but no more than 20 hours and typically 40 minutes to 2 hours. In general, a desired level of starch inhibition may be achieved more rapidly if the heating temperature is increased.

The specific conditions of time of treatment, temperature of treatment, and proportions of the components of the mixture of starch, alcoholic medium and treatment agent are generally selected such that the starch is not gelatinized to a significant extent. That is, the starch remains non-pregelatinized. Thus, in various embodiments of the invention, not more than 30% or not more than 20% or not more than 10% of the starch granules lose birefringence as a resulting of such processing.

When the temperature selected for the heating step exceeds the boiling point of one or more components of the alcoholic medium, it will be advantageous to carry out the heating step in a vessel or other apparatus capable of being pressurized. The treatment may be conducted within a confined zone in order to maintain the alcoholic medium in a liquid state. Additional positive pressure could be employed, but is generally not necessary. The starch may be slurried in the alcoholic medium together with the treatment agent under conditions of elevated temperature and pressure and treated for a time sufficient to change the starch's viscosity characteristics. Such treatment may be conducted in a stirred tank reactor on a batch basis or in a tubular reactor on a continuous basis, although other suitable processing techniques will be apparent to those skilled in the art. In another embodiment, the starch may be in the form of a bed within a tubular reactor and a mixture of the alcoholic medium and treatment agent passed through such bed (optionally, on a continuous basis), with the bed being maintained at the desired temperature to effect inhibition of the starch.

In embodiments of the invention wherein a base has been utilized as a treatment agent, the mixture of starch, alcoholic medium and base may be combined with one or more acids, once the heating step is completed, for the purpose of neutralizing the base. Suitable acids for use in such neutralization step include, but are not limited to, phosphorus-containing acids such as phosphoric acid, carboxylic acids such as acetic acid, adipic acid, itaconic acid, malonic acid, lactic acid, tartaric acid, oxalic acid, fumaric acid, aconitic acid, succinic acid, oxalosuccinic acid, glutaric acid, ketoglutaric acid, malic acid, fatty acids and combinations thereof, as well as other types of acids such as uric acid. If the inhibited starch is intended for use as a food ingredient, the acid generally should be selected to be one that is permitted for such use under applicable regulations. Typically, sufficient acid is added to lower the pH of the mixture to about neutral to slightly acidic, e.g., a pH of from about 5 to about 7 or from about 6 to about 6.5.

The neutralization with acid may be carried out at any suitable temperature. In one embodiment, the slurry of starch, base and alcoholic medium is cooled from the heating temperature used to approximately room temperature (e.g., about 15° C. to about 30° C.) prior to being combined with the acid to be used for neutralization. The neutralized mixture may thereafter be further processed as described below to separate the inhibited starch from the alcoholic medium. In another embodiment of the invention, however, neutralization of the base is followed by further heating of the starch slurry. Such further heating has been found to be capable of modifying the rheological properties of the inhibited starch obtained, as compared to the viscosity characteristics of an analogously prepared starch that has not been subjected to heating after neutralization of the base.

Generally speaking, such further heating step is advantageously carried out at temperatures in excess of room temperature (i.e., 35° C. or greater). At the same time, extremely high temperatures should be avoided. The heating temperature can be, for example, 35° C. to 200° C. Typically, temperatures of from 100° C. to 190° C., 120° C. to 180° C., or from 130° C. to 160° C., or from 140° C. to 150° C. will be sufficient. The heating time generally is at least 5 minutes but no more than 20 hours and typically 40 minutes to 2 hours.

In embodiments of the invention wherein a salt (such as a sodium salt of citric acid) has been employed as the treatment agent, it may be advantageous to cool the starch/treatment agent/alcoholic medium mixture fairly rapidly to approximately room temperature after heating of the mixture has been carried out for the desired period of time. It has been discovered that under at least some conditions that such rapid cooling may provide a more highly inhibited starch as compared to a starch obtained by slower cooling of the starch/treatment agent/alcoholic medium mixture following the heat treatment step.

The mixture of starch and alcoholic medium may be processed so as to separate the starch from the alcoholic medium. Conventional methods for recovering particulate solids from liquids such as filtration, decantation, sedimentation or centrifugation may be adapted for such purpose. The separated starch may optionally be washed with additional alcoholic medium and/or alcohol and/or water to remove any undesired soluble impurities. In one embodiment, neutralization of residual base is accomplished by washing the recovered starch with an acidified liquid medium. Drying of the separated starch will provide an inhibited non-pregelatinized granular starch in accordance with the invention. For example, drying may be performed at a moderately elevated temperature (e.g., 30° C. to 60° C.) in a suitable apparatus such as an oven or a fluidized bed reactor or drier or mixer. Vacuum and/or a gas purge (e.g., a nitrogen sweep) may be applied to facilitate removal of volatile substances (e.g., water, alcohol) from the starch. The resulting dried inhibited non-pregelatinized granular starch may be crushed, ground, milled, screened, sieved or subjected to any other such technique to attain a particular desired particle size. In one embodiment, the inhibited starch is in the form of a free-flowing, granular material.

In one embodiment of the invention, however, the starch is subjected to a desolventization step at a significantly higher temperature (e.g., greater than 80° C. or greater than 100° C. or greater than 120° C.). Excessively high temperatures should be avoided, however, since degradation or discoloration of the starch may result. Such a step not only reduces the amount of residual solvent (alcohol) in the product but also provides the additional unexpected benefit of enhancing the degree of inhibition exhibited by the starch. Desolventization temperatures can, for example, be about 100° C. to about 200° C. Typical temperatures are 120° C. to 180° C. or 150° C. to 170° C. The desolventization may be carried out in the presence or in the absence of steam. Steam treatment has been found to be advantageous in that it helps to minimize the extent of starch discoloration which may otherwise occur at such an elevated temperature. In one embodiment of the invention, steam is passed through a bed or cake of the inhibited starch. The starch desolventization methods of U.S. Pat. No. 3,578,498, incorporated herein by reference in its entirety for all purposes, may be adapted for use in the present invention. Following steam treatment, the inhibited starch may be dried to reduce the residual moisture content (e.g., by heating in an oven at a temperature of from about 30° C. to about 70° C. or in a fluidized bed reactor).

In one embodiment, the treated starch, which has been recovered from the alcoholic medium, is first brought to a total volatiles content of not more than about 35% by weight or not more than about 15% by weight. This can be accomplished, for example, by first air or oven drying the recovered starch at moderate temperature (e.g., 20° C. to 70° C.) to the desired initial volatiles content. Live steam is then passed through the dried starch, the system being maintained at a temperature above the condensation point of the steam. A fluid bed apparatus may be used to perform such a steam desolventization step.

In general, it will be desirable to carry out desolventization under conditions effective to result in a residual alcohol content in the inhibited starch of less than 1 weight % or less than 0.5 weight % or less than 0.1 weight %.

Following desolventization, the inhibited starch may be washed with water and then re-dried to further improve color and/or flavor and/or reduce the moisture content.

The resultant starches are functionally similar to chemically crosslinked starches in that they may have a non-cohesive, smooth texture when cooked out (e.g., to maximize their functionality or performance in a selected application) or gelatinized (e.g., the starch no longer exhibits birefringence or Maltese crosses when illuminated using polarized light), and/or excellent tolerance to processing variables such as heat, shear and extremes of pH, particularly for a significant time under such conditions. Also, the viscosity on cooking initializes (starts to build) at a later or substantially the same time as the same starch which has not been inhibited in accordance with the present invention. Such inhibited starches may also provide a desirable smooth texture to the processed food product and maintain their capacity for thickening throughout processing operations. In addition, the inhibited starch will have less viscosity breakdown than the same starch which has not been treated using the process of the present invention.

The inhibited non-pregelatinized granular starches obtained by practice of this invention may be blended with other unmodified or modified starches or with other food ingredients before use in a food product. The inhibited starches may be used in place of the chemically modified or crosslinked starches presently used in foods, yet maintain a clean label (non-modified label).

Food products wherein the inhibited starches are useful include thermally-processed foods, acid foods, dry mixes, refrigerated foods, frozen foods, extruded foods, oven-prepared foods, stove top-cooked foods, microwaveable foods, full-fat or fat-reduced foods, and foods having a low water activity. Food products wherein the inhibited starches are particularly useful are foods requiring a thermal processing step such as pasteurization, retorting, or ultra high temperature (UHT) processing. The inhibited starches are particularly useful in food applications where stability is required through all processing temperatures including cooling, freezing and heating.

The inhibited starches are also useful in food products where a non-chemically crosslinked starch thickener, viscosifier, gelling agent, or extender is required or desirable. Based on processed food formulations, the practitioner may readily select the amount and type of inhibited non-pregelatinized starch required to provide the necessary thickness and gelling viscosity in the finished food product, as well as the desired texture. Typically, the starch is used in an amount of 0.1-35%, e.g., 2-6%, by weight, of the food product.

Among the food products which may be improved by the use of the inhibited non-pregelatinized granular starches are high acid foods (pH<3.7) such as fruit-based pie fillings, baby foods, and the like; acid foods (pH 3.7-4.5) such as tomato-based products; low acid foods (pH>4.5) such as gravies, sauces, and soups; stove top-cooked foods such as sauces, gravies, and puddings; instant foods such as puddings; pourable and spoonable salad dressings; refrigerated foods such as dairy or imitation dairy products (e.g., yogurt, sour cream, and cheese); frozen foods such as frozen desserts and dinners; microwaveable foods such as frozen dinners; liquid products such as diet products and hospital foods; dry mixes for preparing baked goods, gravies, sauces, puddings, baby foods, hot cereals, and the like; and dry mixes for predusting foods prior to batter cooking and frying. The inhibited starches are also useful in preparing food ingredients such as encapsulated flavors and clouds.

Inhibited starches prepared in accordance with the present invention may also be used in various non-food end use applications where chemically modified (crosslinked) inhibited starches have conventionally been utilized, such as cosmetic and personal care products, paper, packaging, pharmaceutical formulations, adhesives, and the like.

EXAMPLES

Starch Treatment Method A

In this example, starch is first heated in an alcoholic medium in the presence of base (sodium carbonate), followed by neutralization at a lower temperature. After separating the bulk of the alcohol from the inhibited starch, the inhibited starch is subjected to drying/desolventization.

Summary of Treatment Procedure:
1. Weigh out 3 A ethanol (94% by weight) 1177 g.
2. Add 308 g waxy starch (89% dry starch or d.s.) to ethanol while stirring.
3. Add sodium carbonate (either 0.7%, 1.4%, 2.8% or 5.53% by weight, based on dry starch).
4. Transfer the mixture of starch, alcohol and sodium carbonate into a 2-liter high pressure stainless steel reactor equipped with agitation and controlled steam heating through its jacket.
5. Heat the slurry in the reactor to a designated temperature (143° C.) and hold at that temperature for 60 min.
6. Cool the reactor to 35° C.
7. Open vent to equalize pressure.
8. Neutralize the slurry to about pH 6 using 50% citric acid solution (either 0.843%, 1.685%, 3.37% or 6.75% by weight citric acid based on dry starch) using a syringe through a vent.
9. Stir for 30 min.
10. Open the lid.
11. Remove slurry from the reactor.
12. Filter the slurry using a filter paper on a Buchner funnel.
13. Take out and crumble wet cake onto tray in hood and leave for several hours/or overnight before putting in oven. This allows much of the 3 A alcohol to evaporate.
14. Dry starch at 50° C. in convection oven overnight.

15. Grind and pass starch through 100 mesh sieve and label.
16. Dry starch at 125 or 160° C. in convection oven for 4 hours for desolventization.

Desolventization with Steam:
1. Weigh out 3.5 kg DI water in a steel container (7.2" diameter, 8.5" tall).
2. Put the steel container with water in an oven (Yamato DKN 600 mechanical convection oven, Fisher Scientific Inc.) at 160° C. for 1 hour.
3. Weigh and spread 50 g of alcohol-base treated starch (alcohol-base treated starch from procedure step 15 above) on a 500 mesh sieve and place it on a shelf directly on top of the water container.
4. Desolventize the starch at 160° C. for 4 hours.
5. Dry starch at 50° C. overnight in an oven.

Rapid Visco-Analyser Measurement of Starch:

A rapid visco-analyser (RVA) (Newport Scientific Pty. Ltd., Warriewood, Australia) was used to analyze starch pasting profiles. Starch concentrations were varied to give a peak paste viscosity of about 1000 centipoise (cP). In this study, starch concentrations of 5% and 6.65% were used. Heating profiles and RPM are indicated in each graph. RVA pH 6.5 solution (Cat. No. 6654-5, RICCA Chemical Company, Arlington, Texas, USA) and the certified buffer pH 3.5 solution (Key Laboratory Services, 2363 Federal Drive, Decatur, IL) were used. The Cookup RVA profile is intended to measure the RVA viscosity of cook-up waxy starch. Starch was weighed into an RVA cup and RVA pH 6.5 or pH 3.5 solutions were added to a total weight of 28 g. The Instant RVA profile was intended to analyze instant starches. Starch was weighed into the RVA cup and 4.5 g propylene glycol was added for dispersion of the starch. The mixture was stirred with a spatula to make sure complete dispersion was achieved. RVA pH 6.5 solution was added to a total weight of 32 g. The starch slurry was mixed at 35° C. for 20 min at the initial stage to develop paste viscosity of instant starches.

Microscopy of Starch Paste:

Starch paste was diluted with distilled water to about 1% starch. One drop of starch solution was added to a microscope slide and dyed with iodine tincture (2% O.S.P.) or solution containing 0.2% 12 and 2% KI. A cover slip was added on top of each sample. The slide with dyed starch sample was observed using a Leica Microscope DM4000 M (Buffalo Grove, IL 60089 United States). A 20× objective lens and 10× binoculars under transmitted light were used. Starch granules stained with solution containing 0.2% 12 and 2% KI and illuminated with polarized light were also observed using this microscope.

Specific Sedimentation Volume of Starch after RVA Cooking:

Specific sedimentation volume (SSV) is defined as the bulk volume occupied by swollen starch granules per mass unit of dry starch (mL/g). Each starch was cooked using a Rapid-Visco analyzer (RVA) under the following conditions: dry solids percent (DS %)=2.5% dry starch in the slurry; 38 g total slurry; Cookup RVA profile (160 rpm, 20 min at 95° C., cool down to 50° C., total run 35 min); pH 6.5 phosphate buffer. The water loss during the RVA was accounted for by weighing before and after cooking. The paste was then transferred into a tared 30-mL centrifuge tube without dilution, weighed, and centrifuged at 4000 rpm for 15 minutes in a bench-top Sorvall Legend T+ centrifuge. The sediment volume was read after the supernatant had been decanted. SSV (mL/g) (mL sediment after 15 min at 4000 rpm)/(g paste in 30 mL*dry starch content % in the paste). Starch with SSV between 20 mL/g to 40 mL/g is considered having low shear stability or low cross-linked in chemically cross-linked starch. Starch with SSV between 16 mL/g to 20 mL/g has medium shear stability and starch with SSV<16 mL/g has high shear stability.

Starch Color Measurement:

Color was measured using a Hunter Colorflex reflective spectrophotometer (Hunterlabs, Reston, VA).

Retort Simulation Using Physica MCR 301 Rheometer with Pressure Cell:

A Physica MCR 301 Rheometer (Anton Paar Germany GmbH, Ostfildern, Germany) was used to simulate retort processing. Starch was weighed into a cup and RVA pH 6.5 solution (Cat. No. 6654-5, RICCA Chemical Company, Arlington, Texas, USA) was added to a total weight of 25 g of slurry. The percentage of starch should be high enough to give a viscosity of above about 1000 mPa·s at 120° C. A higher concentration of starch is required for a more highly inhibited starch. 20 g slurry was loaded to the pressure cell using a syringe. A two wing stirrer (ST24/PR-2W-A1) was used. There is an initial heating to 60° C., then the sample is held at 60° C. to record the viscosity, followed by slow heating to 120° C. (typical retort temperature) with a 5 minute hold. The starch slurry is then cooled in 2 stages for double record of viscosity stability at medium hot (70° C.) and cold (25° C.) temperatures. The system is under a "high" shear at a shear rate of 177 $min^{-1}$ during the heating and cooling phases in order to ensure product homogeneity and a "low" shear at a shear rate of 29.3 $min^{-1}$ during the high temperature (120° C.) hold step to maximize viscosity reading and enhance differences between batches. The viscosity curve during 5 min holding time at 120° C. is important for retort stability. An upward curve or line at 120° C. holding time indicates swelling of starch granules and highly inhibited starch. A downward curve or line indicates breakdown of pastes. The pastes after measurements were examined under a microscope.

Results and Discussion (Starch Treatment Method A)

As previously described, waxy starch was treated in alcohol with sodium carbonate (1.4% based on dry starch) at 143° C. for 1 hour and then neutralized with citric acid. The treated waxy starch was collected by filtration. Additional alcohol was removed by evaporation in the hood overnight, drying in a forced air oven at 50° C. and then at 160° C. with or without steam (desolventization) for 4 hours.

FIG. 1 shows the RVA profiles (Cookup) (5% and pH 6.5) of waxy starch (Sample 1-D), waxy starch after alcohol-base treatment at 143° C. for 1 hr (Sample 1-A), and waxy starch after alcohol-base treatment at 143° C. for 1 hr and desolventization at 160° C. with (Sample 1-C) or without (Sample 1-B) steam for 4 hours. Alcohol-base treatment alone reduced the RVA breakdown (the peak or maximum viscosity minus the trough or minimum viscosity after the peak) by about 50% and increased the final viscosity by about 43%. The micrographs of the pastes after RVA analyses showed that the waxy starch paste was dispersed while the starch paste of waxy starch after alcohol-alkaline treatment contained swollen granule remnants (broken swollen granules) (FIG. 2), which indicated that alcohol-base treatment helped to maintain swollen granule remnants but was not enough to hold the swollen granule structure. Desolventization with or without steam after alcohol-base treatment eliminated the RVA breakdowns (FIG. 1). Alcohol-base treated waxy starch desolventized without steam has a lower RVA final viscosity than that desolventized with steam. The micrographs of pastes after RVA analyses showed that starch pastes of alcohol-alkaline treated waxy starch desolventized with or without steam both maintained the starch granule structure.

Specific sedimentation volume (SSV) measurements indicated higher inhibition of alcohol-alkaline treated waxy starch desolventized without steam compared to that with steam (Table 1), probably caused by the less swelling of starch granules of the former during RVA. However, dry starch (less than 1% moisture) at a high temperature is an explosion hazard; therefore desolventization with steam is considered a safer process in an industrial scale. In addition, desolventization at 160° C. with steam produced less color in the product than that desolventized without steam (Table 2).

TABLE 1

| Sample | Alcohol-Base Treatment | Desolventization | SSV, mL/g |
|---|---|---|---|
| 1-D | None | None | 39 |
| 1-A | 1.4% $Na_2CO_3$, 143° C., 1 hr | None | 39 |
| 1-B | 1.4% $Na_2CO_3$, 143° C., 1 hr | 160° C., 4 hrs | 13 |
| 1-C | 1.4% $Na_2CO_3$, 143° C., 1 hr | Steam, 160° C., 4 hrs | 18 |

TABLE 2

| Sample | Alcohol-Base Treatment | Desolventization | Whiteness Index | Yellowness Index |
|---|---|---|---|---|
| 1-B | 1.4% $Na_2CO_3$, 143° C., 1 hr | 160° C., 4 hrs | 41.5 | 17.8 |
| 1-C | 1.4% $Na_2CO_3$, 143° C., 1 hr | Steam, 160° C., 4 hrs | 50.9 | 14.8 |

Figure 3:
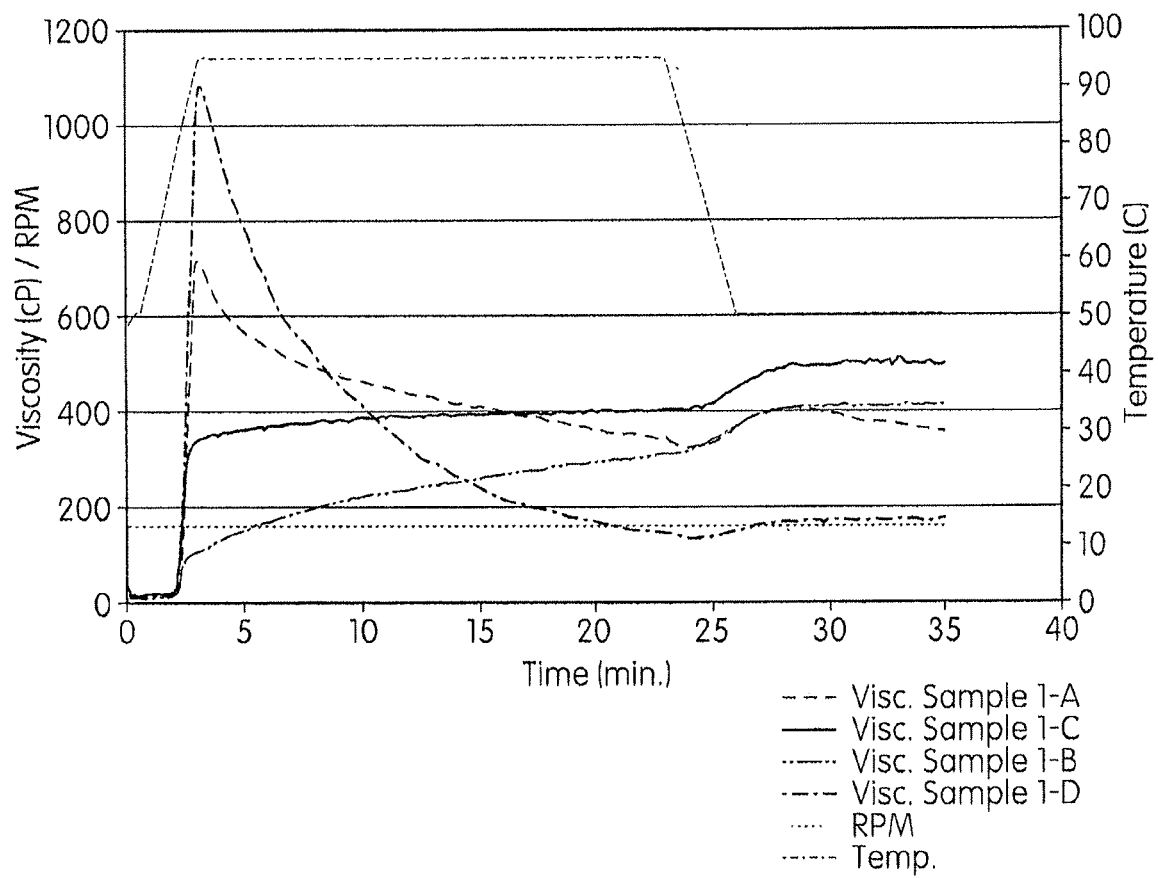
FIG. 3 shows the RVA profiles (Cookup) of different starch samples measured at a 5% concentration in a pH 3.5 aqueous medium.

Positive slopes were maintained (no breakdown in viscosity of the pastes) in alcohol-base treated waxy starches after desolventization with and without steam during RVA analyses using 5% sample concentration in pH 3.5 buffer (FIG. 3), indicating that the pastes were stable in acidic conditions. Micrographs of the pastes after RVA using pH 3.5 buffer showed granular structure in the desolventized samples (FIG. 4).

Retort simulation using a rheometer was employed to simulate retort processing at 120° C. in soup production to test the stability of starch pastes under high temperature conditions. In this test, starches with slightly negative, zero or positive slopes at 120° C. holding time are potentially acceptable for soup and other high temperature applications. Native waxy starch is not suitable for soup and foods requiring high temperature processing by this criterion. Alcohol-base treated waxy starch without desolventization is not an ideal candidate. Alcohol-base treated waxy starches desolventized with and without steam at 160° C. are potentially suitable for soup and foods requiring high temperature processing. Micrographs of the pastes after retort simulation are shown in FIG. 5. Starch pastes of alcohol-base treated waxy starch desolventized with and without steam both maintained the starch granule structure, which provided structural evidence that they were retort stable.

Figure 7:
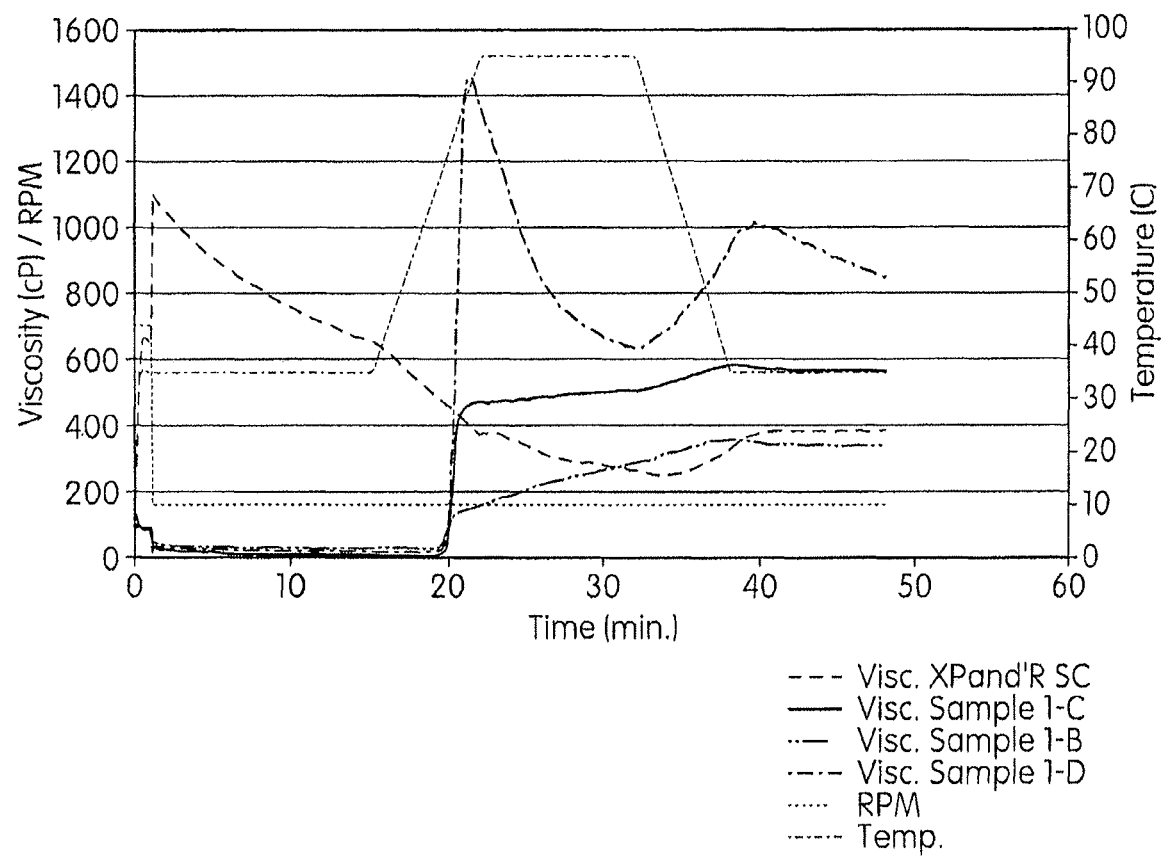
FIG. 7 shows the RVA profiles (Cookup) of various starch samples measured at a 5% concentration in a pH 6.5 aqueous medium.

Samples of non-pregelatinized granular starches after alcohol-base treatment followed by desolventization which were illuminated with polarized light exhibited the microscopic images shown in FIG. 6; their RVA profiles are shown in FIG. 7. Native starch granules show birefringence or a typical Maltese cross when viewed in polarized light. This property (exhibition of a Maltese cross) is brought about because the starch molecules are radially oriented within the granule. When starch is heated in water, birefringence (Maltese cross pattern) in polarized light is lost by the end of starch gelatinization. FIG. 6 shows that the Maltese cross patterns of starch granules are virtually unchanged when waxy starch is processed with alcohol-base treatment followed by desolventization with or without steam, which indicates that the starches are non-pregelatinized. Pregelatinized starch develops viscosity in RVA using the Instant profile in the initial 20 minutes at 35° C. before further heating up. Pregelatinized instant waxy starch (XPAND'R SC, a Tate & Lyle commercial product) developed viscosity immediately at 35° C. while native waxy starch and waxy starches after alcohol-alkaline treatment followed by desolventization did not develop discernible viscosity until they were heated to a higher temperature, which suggested they are non-pregelatinized starches.

Waxy starch was treated in alcohol with various amounts of sodium carbonate (0.7%, 1.4%, 2.8% and 5.53% based on dry starch) at 143° C. for 1 hour and then neutralized with citric acid. Desolventization was conducted at 125 or 160° C. for 4 hours. Table 3 shows that increasing amounts of sodium carbonate and citric acid for neutralization tend to result in decreasing SSV values (higher inhibition) of the products. The same alcohol-base treated starch desolventized at a high temperature (160° C.) gave more inhibited products (lower SSV values) than when desolventized at a lower temperature (125° C.). The product treated using 5.53% sodium carbonate and desolventization at 160° C. was inhibited more than Starches A-C, which were commercially available inhibited or modified starches.

TABLE 3

| Sample | Alcohol-Base Treatment | Desolventization | SSV, mL/g |
|---|---|---|---|
| 2-A | 5.53% $Na_2CO_3$, 143° C., 1 hr | 125° C., 4 hrs | 24 |
| 2-B | 5.53% $Na_2CO_3$, 143° C., 1 hr | 160° C., 4 hrs | 9 |
| 2-C | 2.8% $Na_2CO_3$, 143° C., 1 hr | 125° C., 4 hrs | 27 |
| 2-D | 2.8% $Na_2CO_3$, 143° C., 1 hr | 160° C., 4 hrs | 11 |
| 2-E | 1.4% $Na_2CO_3$, 143° C., 1 hr | 125° C., 4 hrs | 30 |
| 2-F | 1.4% $Na_2CO_3$, 143° C., 1 hr | 160° C., 4 hrs | 13 |
| 2-G | 0.7% $Na_2CO_3$, 143° C., 1 hr | 125° C., 4 hrs | 33 |
| 2-H | 0.7% $Na_2CO_3$, 143° C., 1 hr | 160° C., 4 hrs | 16 |
| Starch A | N/A | N/A | 24 |
| Starch B | N/A | N/A | 18 |
| Starch C | N/A | N/A | 13 |

Figure 8:
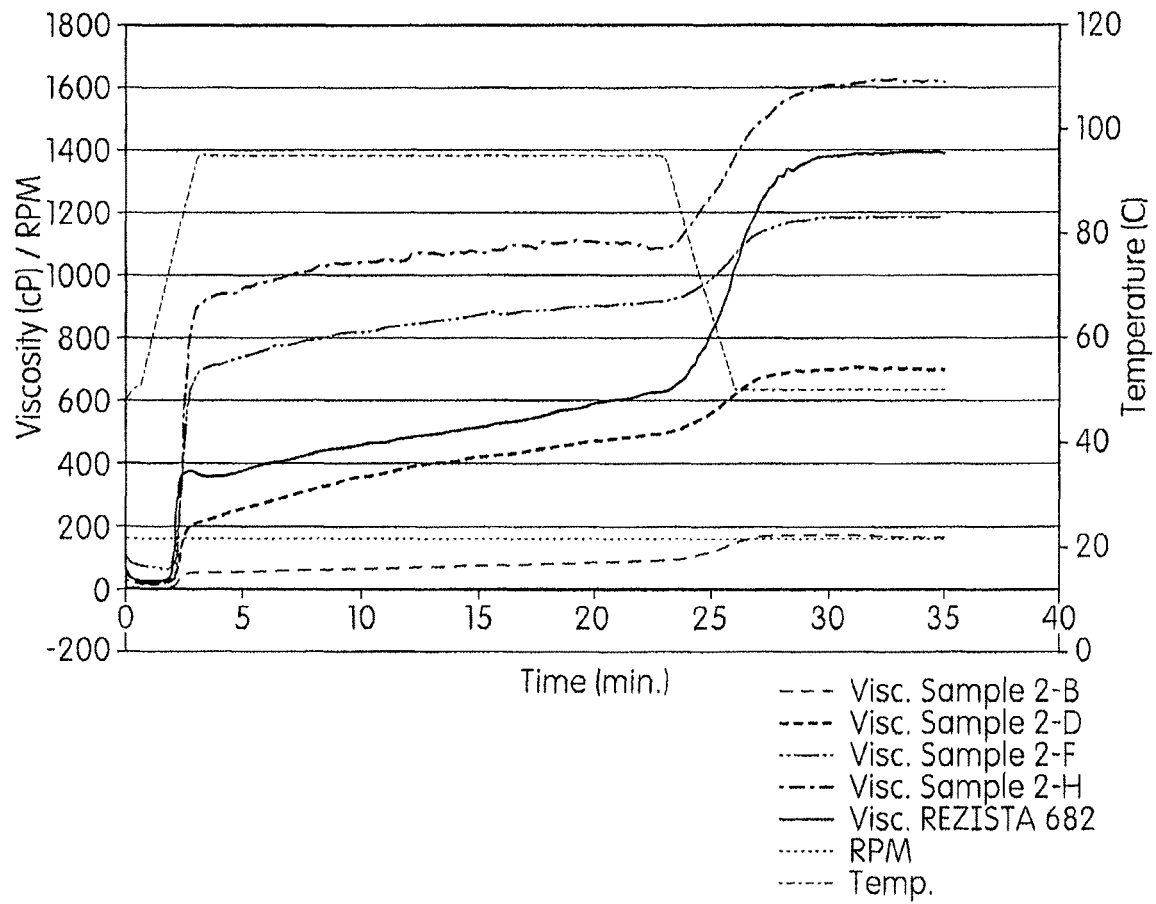
FIGS. 8 and 9 show the RVA profiles of various starch samples, including samples prepared in accordance with the invention as well as a chemically modified waxy starch with high cross-linking available commercially from Tate & Lyle.

FIG. 8 shows the RVA profiles of waxy starch after being treated in alcohol with various amounts of sodium carbonate and desolventized at 160° C. for 4 hours and a Tate & Lyle commercial chemically modified waxy starch with high cross-linking. All the samples showed no RVA breakdown after alcohol-base treatment. The viscosities of treated waxy starches decreased with increasing amounts of sodium carbonate in the alcohol-base treatment and citric acid in the neutralization thereafter. The alcohol-base treated samples behaved like chemically cross-linked starches in the RVA analysis.

Figure 9:
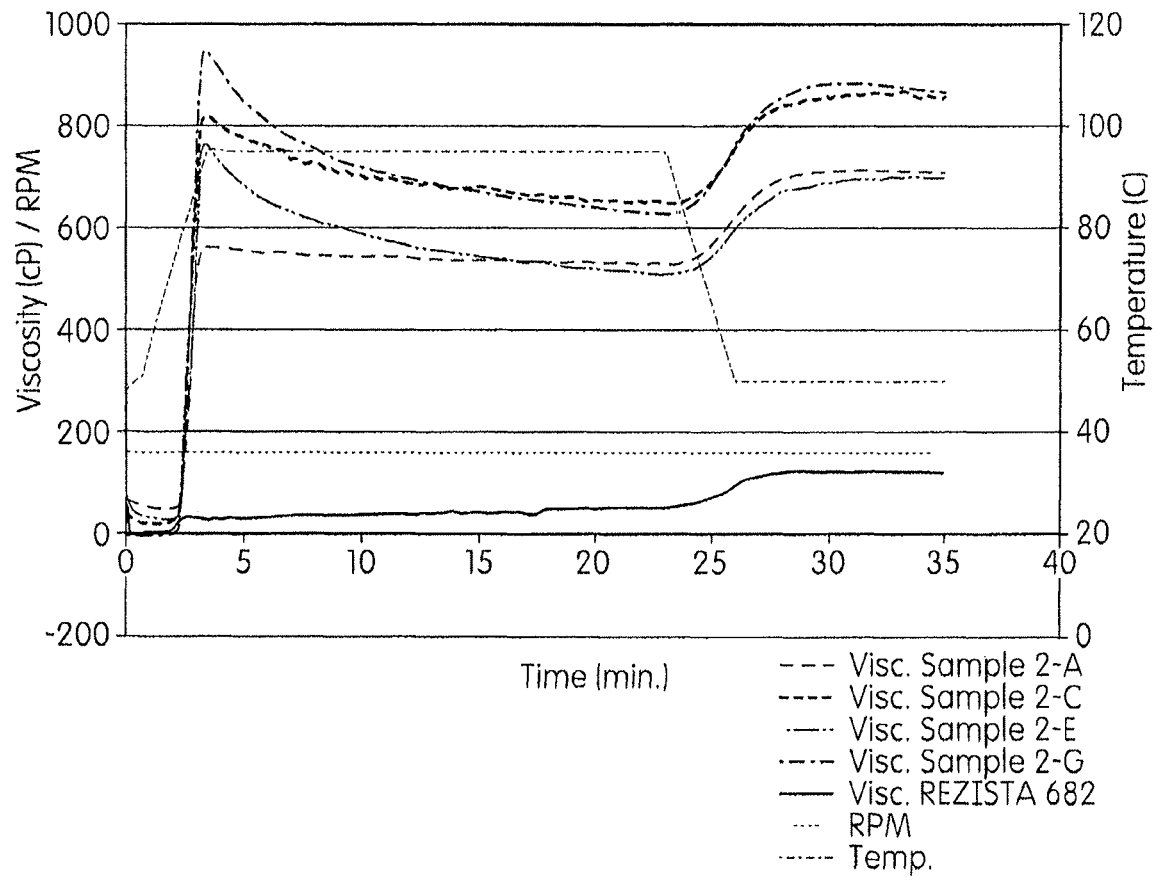

These same alcohol-base treated samples were desolventized at a low temperature (125° C.) and their RVA profiles are shown in FIG. 9. Significantly less inhibition was exhibited by the samples desolventized at a low temperature (FIG. 9). The RVA breakdown increased with decreasing amounts of sodium carbonate (from 5.53% to 0.7%).

Figure 10:
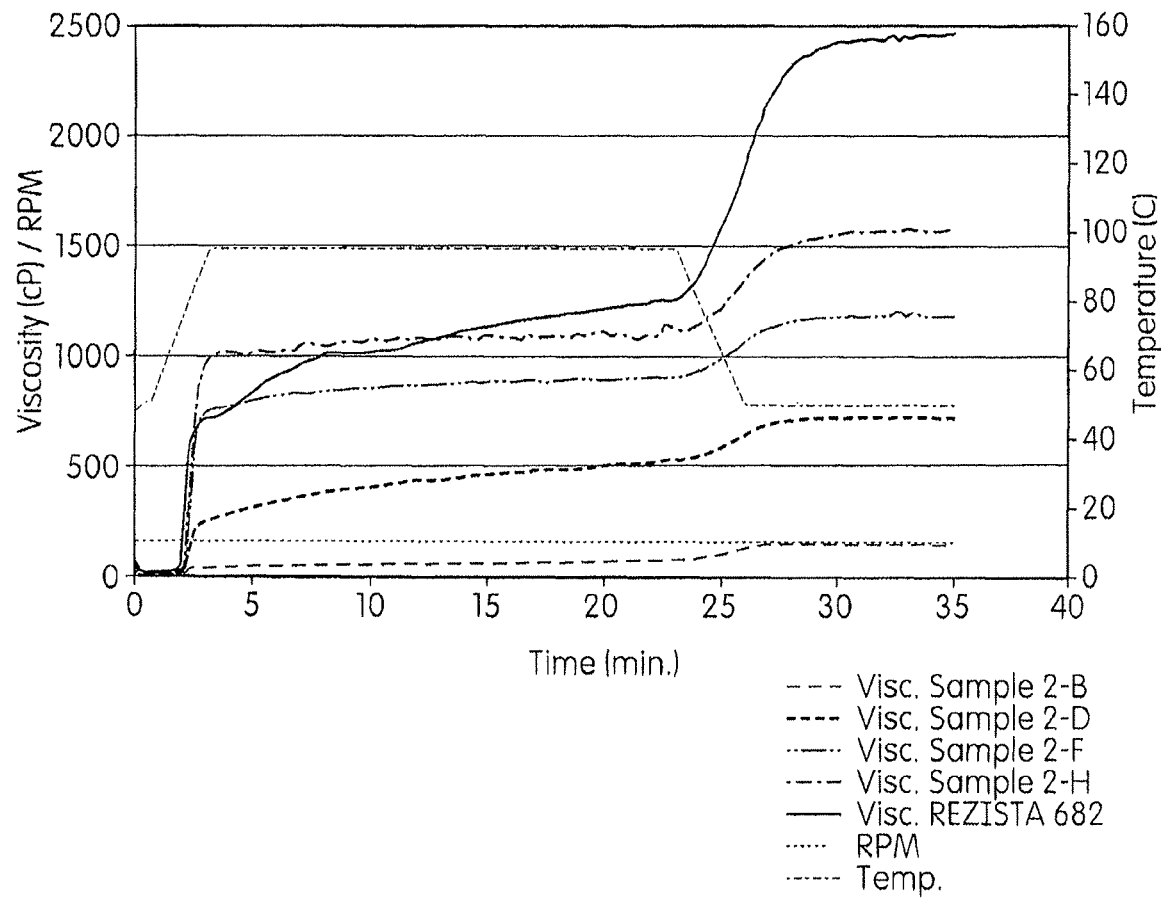
FIGS. 10 and 11 show the RVA profiles of various starch samples measured at 6.65% in a buffer having a pH of 3.5.
Figure 11:
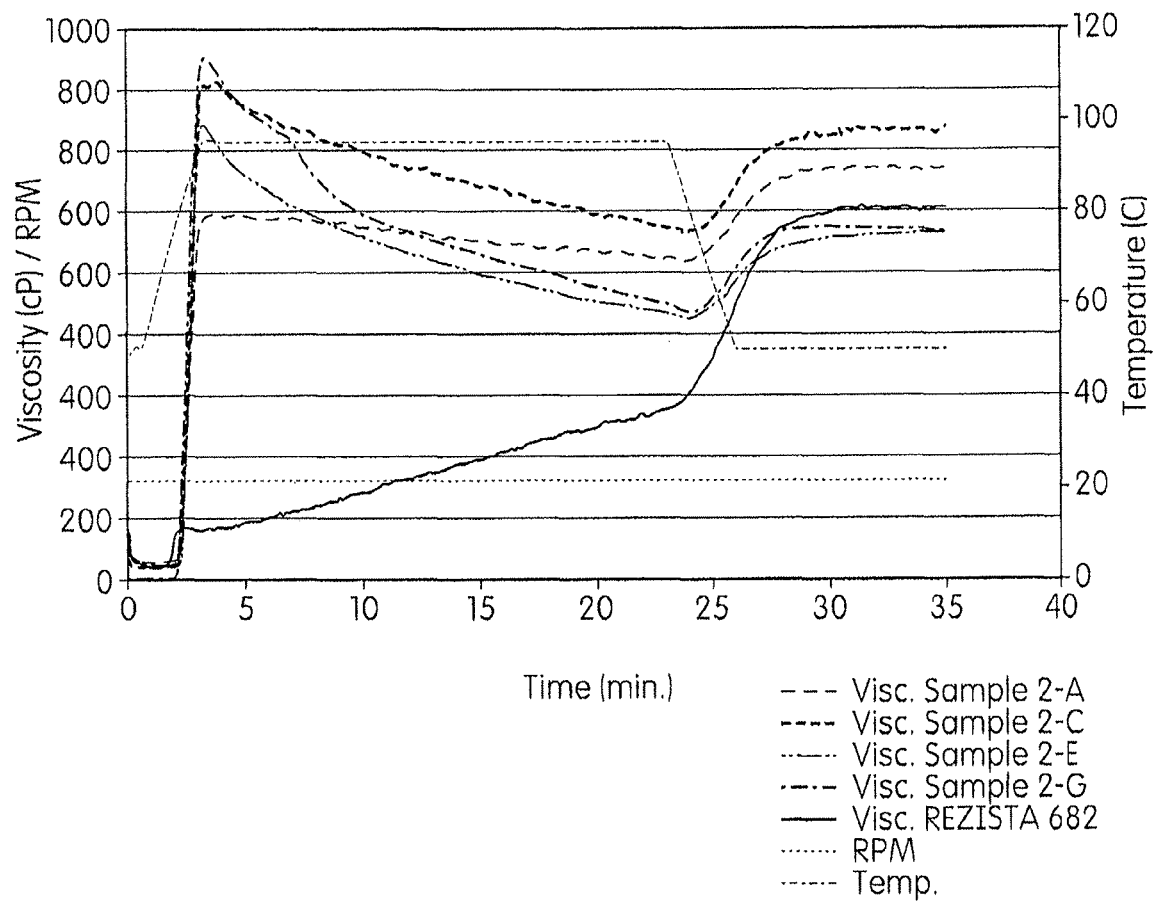

The acid stabilities of alcohol-base treated samples which were desolventized at 160° C. were tested using RVA in a pH 3.5 buffer (FIG. 10). No RVA breakdown was observed in the RVA profiles, indicated that these treated starches were acid stable. Significant RVA breakdowns were exhibited by the samples desolventized at 125° C. with breakdown increasing with decreasing amounts of sodium carbonate (from 5.53% to 0.7%) (FIG. 11).

The high temperature stabilities of starches were tested using a Physica MCR 301 Rheometer. The viscosities of alcohol-base treated samples prepared using 2.8%, 1.4% and 0.7% sodium carbonate in alcohol treatment followed by desolventization at 160° C. showed increases in 5 minute holding time at 120° C., which indicated no breakdown of paste and paste stability at a high temperature.

FIGS. 12, 13, 14 and 15 show micrographs of starch granules in the pastes after RVA and retort simulation using a Physica MCR 301 Rheometer. When alcohol-base treated starches were desolventized at 160° C., intact swollen starch granules were clearly visible. The intact swollen starch granules after RVA and retort simulation clearly demonstrated the inhibition of starch granules after treatment in accordance with the invention. When alcohol-base treated samples were desolventized at 125° C., the starch granules swelled more than starches desolventized at 160° C. and some swollen starches were broken down. The extent of starch granule breakdown was inversely related to the amounts of sodium carbonate and the amounts of citric acid used during the neutralization thereafter.

Starch Treatment Method B

In this example, starch is treated using a procedure involving two heat cycles wherein the starch was first heated with base in an alcoholic medium and then further heated following addition of citric acid to neutralize the base (providing a pH of about 6).

Waxy starch (308 g, 11% moisture) was added to 3 A ethanol (1177 g; 7.18% water) while stirring. Anhydrous sodium carbonate (7.585 g; 2.77% by weight based on dry starch) was then added. The resulting slurry was transferred into a two liter high pressure stainless steel reactor equipped with agitation and controlled steam heating through its jacket. The slurry was heated in the reactor with agitation to 143° C. and held at that temperature for 60 minutes. After cooling the reactor contents to 25° C., the slurry was neutralized using 18.5 g of a 50% citric acid solution (3.37% by weight based on dry starch). The reactor contents were again heated to 143° C. with agitation and kept at that temperature for 60 minutes. After cooling to 25° C., the slurry was filtered through filter paper in a Buechner funnel to provide a wet cake of starch. The wet cake was crumbled onto a tray and left for several hours in a hood for several hours before being put into an oven, to allow much of the 3 A alcohol to evaporate. The starch (identified hereafter as "7629-68") was thereafter dried at 50° C. in a convection oven overnight and then ground and passed through a 100 mesh sieve.

Desolventization of the starch with steam was carried out by placing 3.5 kg deionized water in a steel container (7.2" diameter, 8.5" tall), heating the steel container in an oven at 125° C. for 1 hour, spreading 50 g of the treated starch on a 500 mesh sieve and placing it on a shelf directly on top of the steel container, and desolventizing the starch at 125° C. for 4 hours. The starch was then dried overnight in a 50° C. oven.

Rapid Visco-Analyser Measurement of Starch

A Rapid Visco-Analyser (RVA) (Newport Scientific Pty. Ltd., Warriewood, Australia) was used to analyze starch pasting profiles. A starch concentration of 5% was used in the RVA slurry. Heating profiles and RPM are indicated in each graph. A RVA pH 6.5 buffer solution (Cat. No. 6654-5, RICCA Chemical Company, Arlington, Texas, USA) and a certified buffer pH 3.5 solution (Key Laboratory Services, 2363 Federal Drive, Decatur, IL) were used. The Viswaxy RVA profile with a 20-minute hold at 95° C. is intended to measure the RVA viscosity of cook-up waxy starches. Starch was weighed into a RVA cup and RVA pH 6.5 or pH 3.5 solutions were added to a total weight of 28 g.

Method for Measuring Sedimentation Volumes with and without Shearing

1. Measure moisture of the starch.
2. Weigh 5% ds starch in a 250 mL wide-mouthed sample glass jar and add DI water or 1% NaCl solution to 100 g.
3. Record the weight of the jar (optional).
4. Place the jar in a water bath at 95° C. and stir the contents using a glass rod for 3 min while heating.
5. Remove the glass jar and secure it with a cap.
6. Place the jar into another water bath shaker at 95° C. (Boekel Shaker hot tub).
7. Cook the sample at 95° C. for 20 min with orbital shaking at 120 rpm.
8. After 20 min, take the sample from the shaker and place it another water bath at room temp and cool the starch paste.
9. Record the weight of the jar (optional).
10. Add ~40-50 mL of DI water or 1% NaCl solution to a 100 mL graduated cylinder and add 20.0 g of the cooked starch paste. Fill the rest of the volume (100 mL mark) with DI water or 1% NaCl solution.
11. Seal the graduated cylinder with paraffin and shake the contents to form a uniformly distributed starch suspension (1% ds).
12. Set aside the graduated cylinder without any disturbance.
13. Record the sediment volume after 24 h.
14. For measurement of sedimentation volume after shearing, add 50 g of the starch paste in water or 1% NaCl solution into the blender. Shear at 35 V setting for starch in water and 25 V setting for starch in 1% NaCl solution for 20 sec. Follow the usual sedimentation procedure of the sheared starch paste.

Microscopy of Starch Paste:

1. Put 20 µL of as-is starch paste (5%) onto a microscopy glass slide.
2. Apply 20 µL of 0.02 N iodine stock solution onto the paste.
3. Use a tooth pick to blend the paste and the iodine evenly on the glass slide.
4. Apply a piece of cover glass onto the blend and examine the sample using a 5× objective lens and 10× binoculars under transmitted light on the Leica DM4000 optical microscope.
5. Go through the whole area of sample under the cover glass and take images with granule concentration that is representative of the entire sample.
6. For un-sheared starch paste sample, number of intact granules is counted as the total number of intact waxy granules in the 50× magnification image.
7. For sheared starch paste sample, number of intact granules is counted manually since the microscopy image has to be magnified to tell intact waxy granules apart from fragments.

8. Percentage of fragmentation=(number of intact waxy granules in un-sheared sample−number of intact waxy granules in sheared sample)/number of intact waxy granules in un-sheared sample.

Microscopy of Starch Under Polarized Light:

Starch (10 mg) was placed on a microscope slide. A drop of distilled water was added and mixed with starch. A cover slip was added on top of a sample. The slide with starch sample was observed using the Leica Microscope DM4000 M (Buffalo Grove, IL 60089 United States) illuminated with polarized light using a 20× objective lens and 10× binoculars.

Results and Discussion (Starch Treatment Method B)

Table 4 shows the sedimentation volumes in 1% NaCl of the alcohol-alkaline treated starch before and after desolventization at 125° C. and 160° C.

TABLE 4

Sedimentation Volumes (mL) and Fragmented Cooked Starch Granules after Shear in 1% NaCl solution

| Sample | Sedimentation Volume (mL) | | Microscopy |
|---|---|---|---|
| | Un-sheared | Sheared 25 Volts for 20 sec | % Fragmented Granules |
| 7629-68, 2.77% Na$_2$CO$_3$, 2HC | 21 | 20 | 21% |
| 7629-68, 2.77% Na$_2$CO$_3$, 2HC, desol 125° C. | 22 | 19.5 | 17% |
| 7629-68, 2.77% Na$_2$CO$_3$, 2HC, desol 160° C. | 17.8 | 16 | 14% |

Table 5 shows the sedimentation volumes of the alcohol-alkaline treated samples of 7629-68 before and after desolventization at 125° C. and 160° C. in water, which exhibited higher sedimentation volumes than those observed in 1% NaCl solution.

TABLE 5

Sedimentation Volumes (mL) and Fragmented Cooked Starch Granules after Shear in Purified Water

| Sample | Sedimentation Volume (mL) | | Microscopy |
|---|---|---|---|
| | Un-sheared | Sheared 35 Volts for 20 sec | % Fragmented Granules |
| 7629-68. 2.77% Na$_2$CO$_3$, 2HC | 25 | 27 | 13% |
| 7629-68, 2.77% Na$_2$CO$_3$. 2HC, desol 125° C. | 26 | 26 | 11% |
| 7629-68, 2.77% Na$_2$CO$_3$. 2HC, desol 160° C. | 21 | 20 | 14% |

Figure 16:
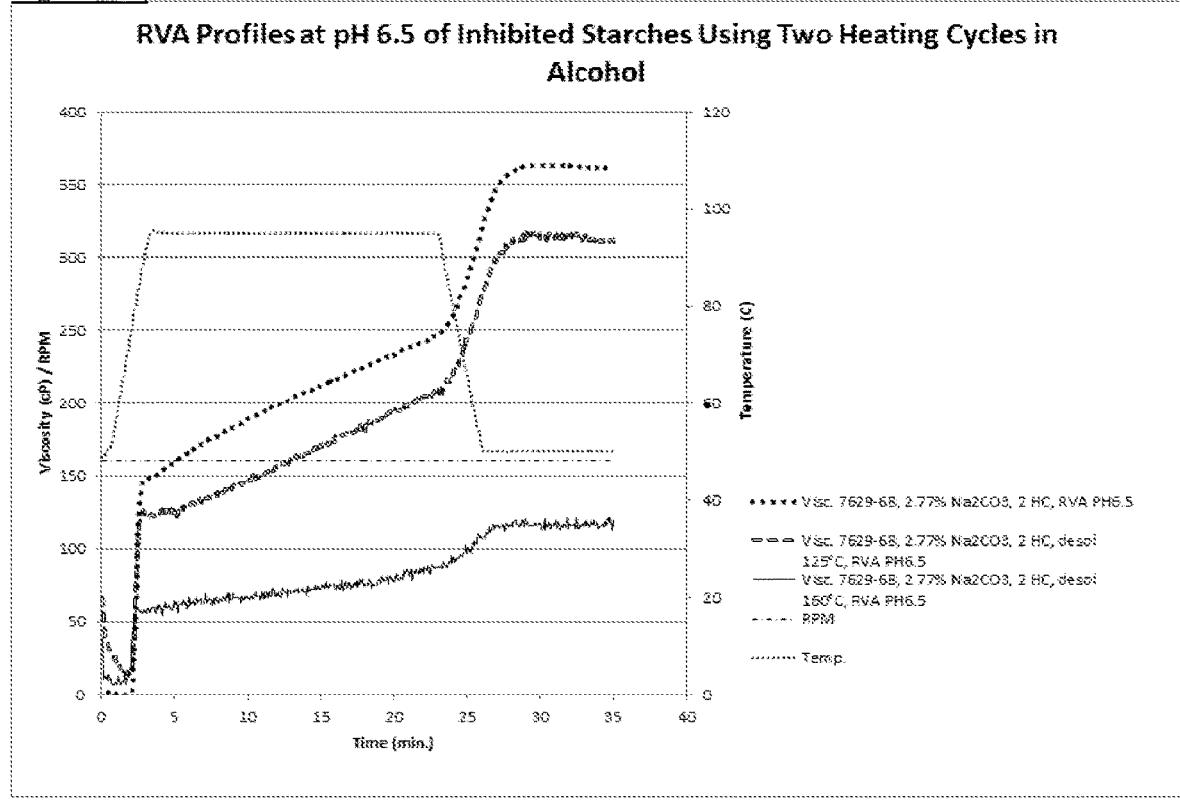
FIGS. 16, 17 and 24 show the RVA profiles at different pHs of treated starch samples before and after desolventization.
Figure 17:
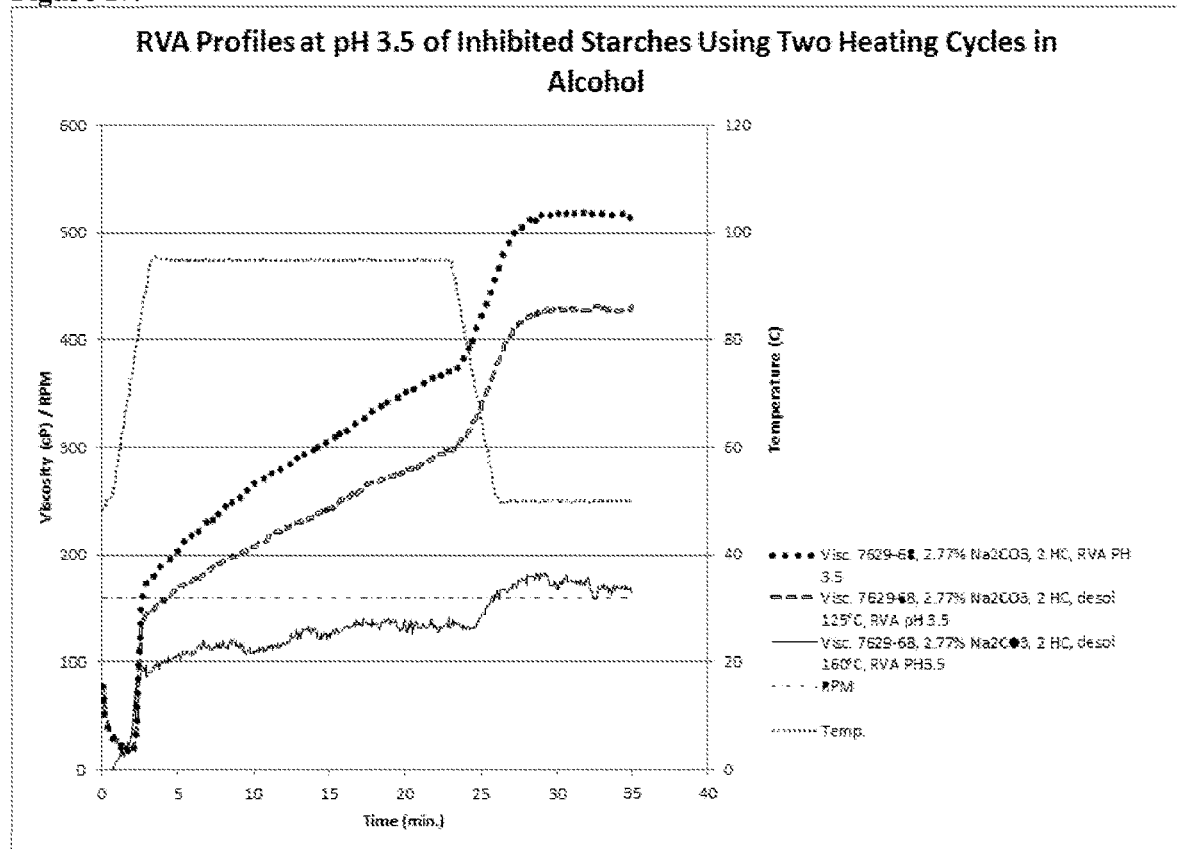

The RVA profiles of the alcohol-alkaline treated samples 7629-68 before and after desolventization at 125° C. and 160° C. are shown in FIG. 16 (RVA pH 6.5) and FIG. 17 (RVA pH 3.5).

Figure 18:
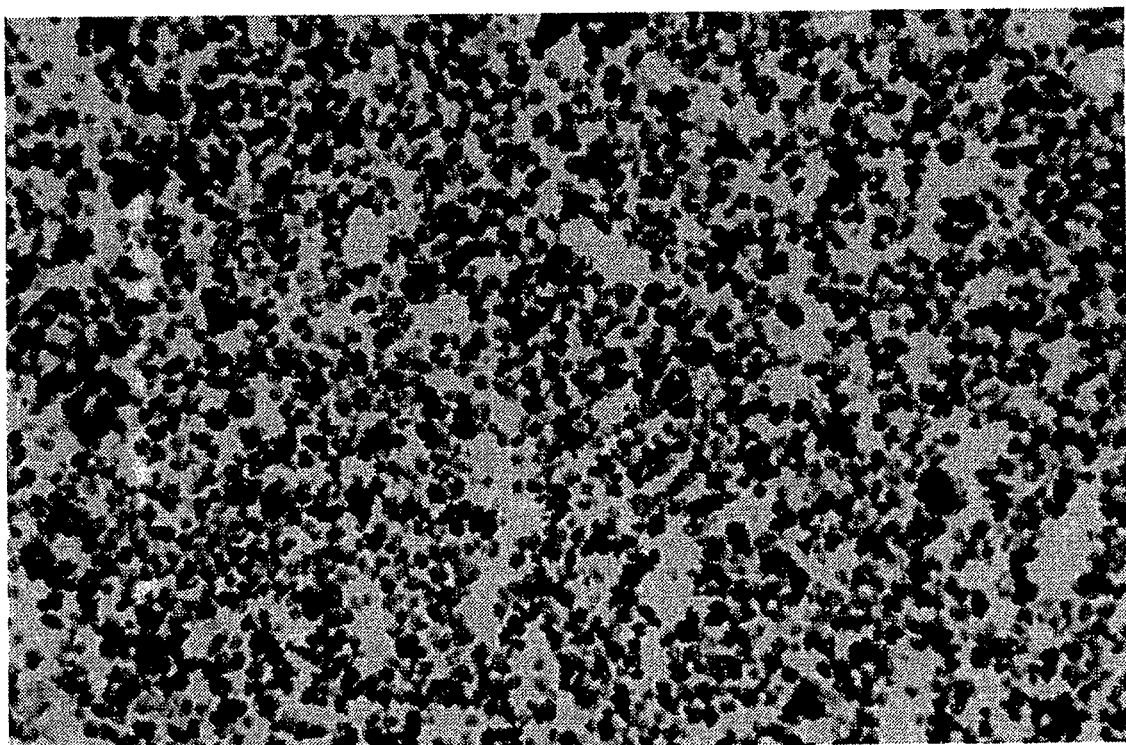
Figure 19:
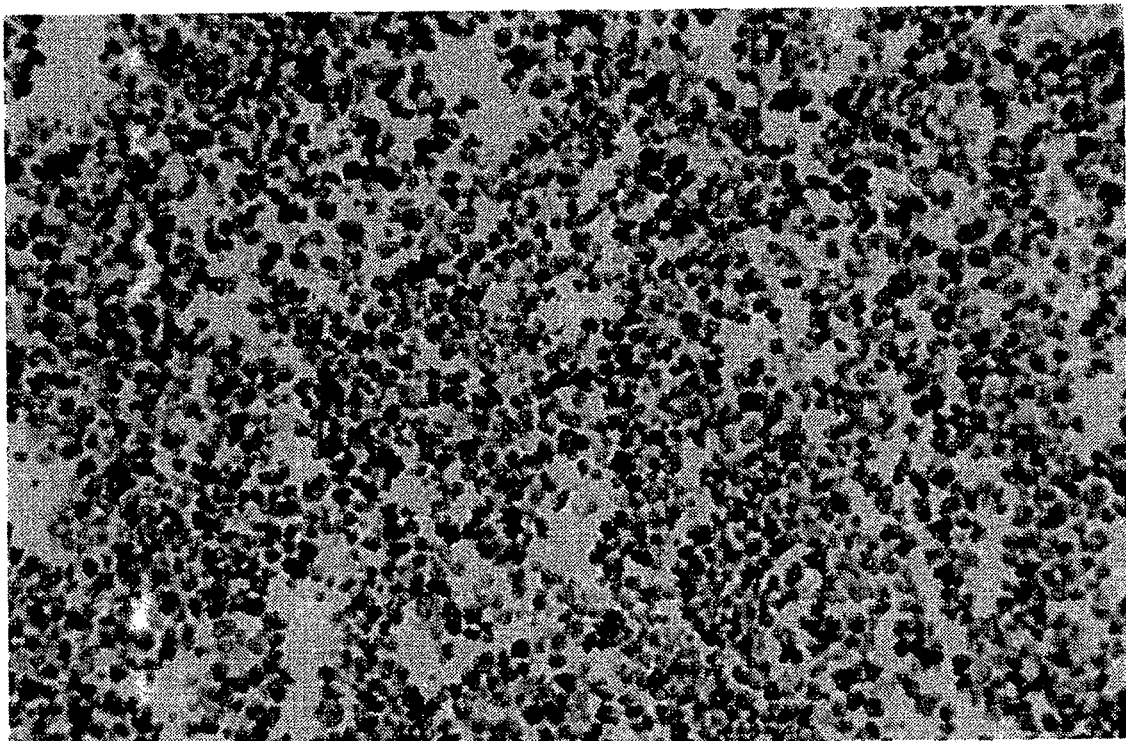
Figure 20:
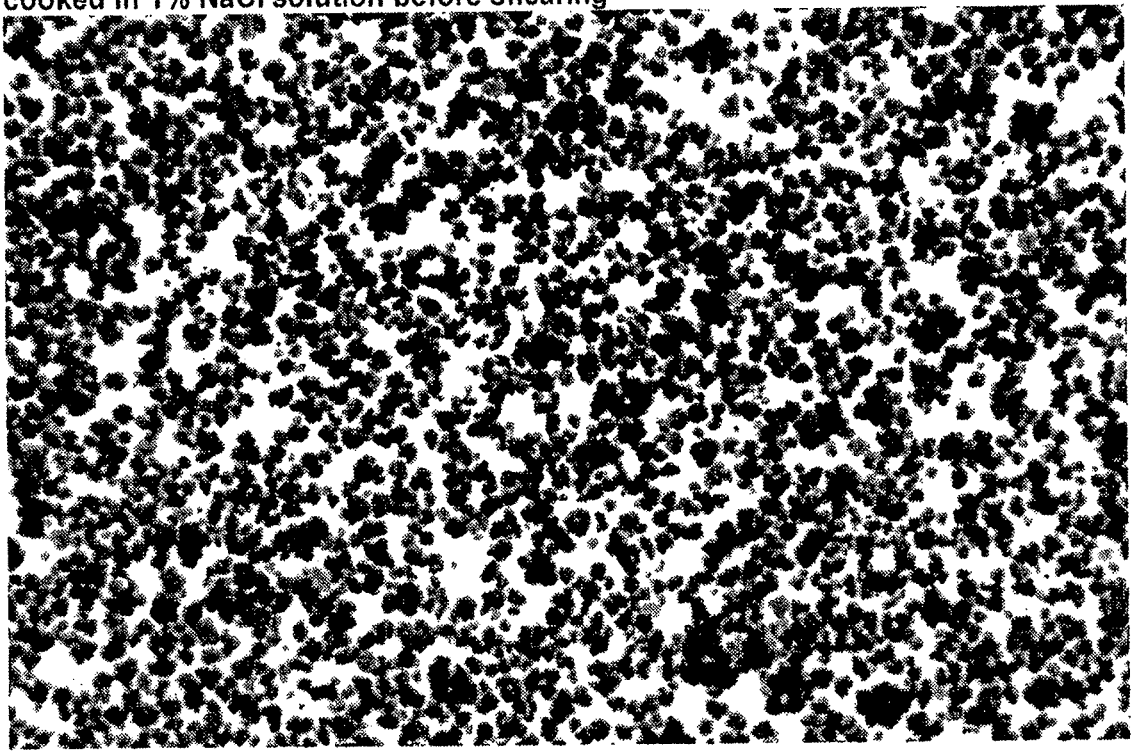
Figure 21:
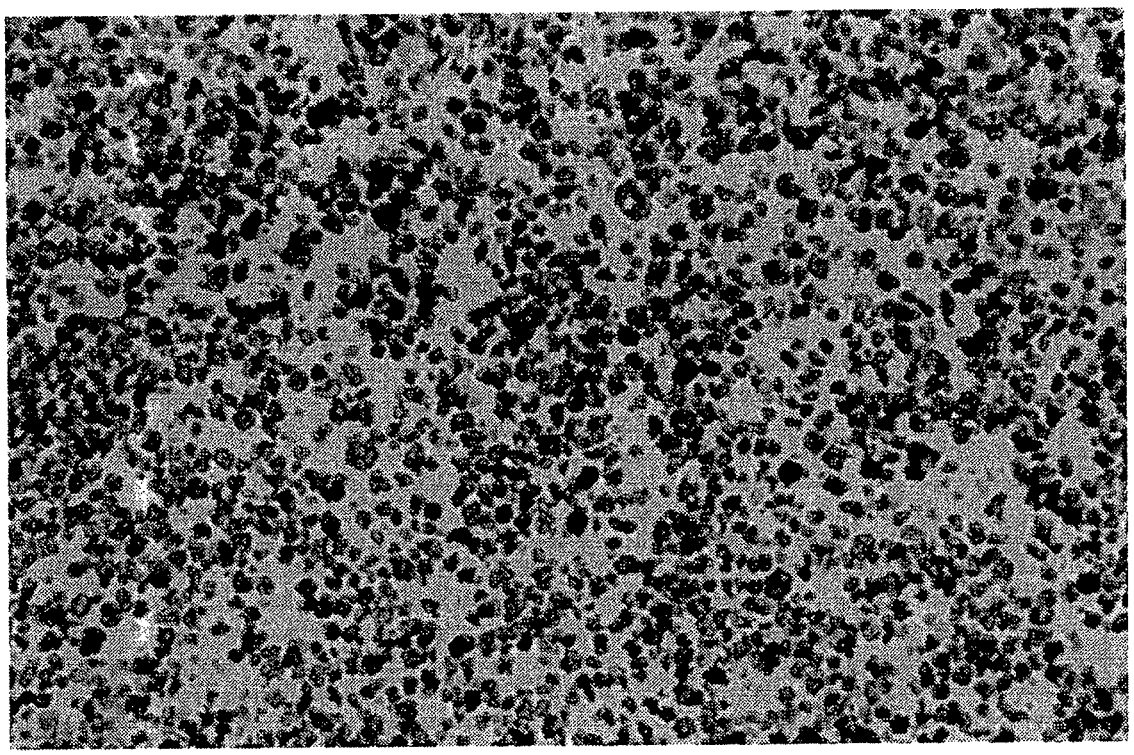

FIGS. 18 and 20 are micrographs of starch cooked in 1% NaCl as prepared for measuring the un-sheared sedimentation volumes. FIGS. 19 and 21 are micrographs of starch cooked in 1% NaCl and then sheared using a blender as prepared for measuring the sheared sedimentation volumes. No significant fragmentation of granules was observed.

Figure 22:
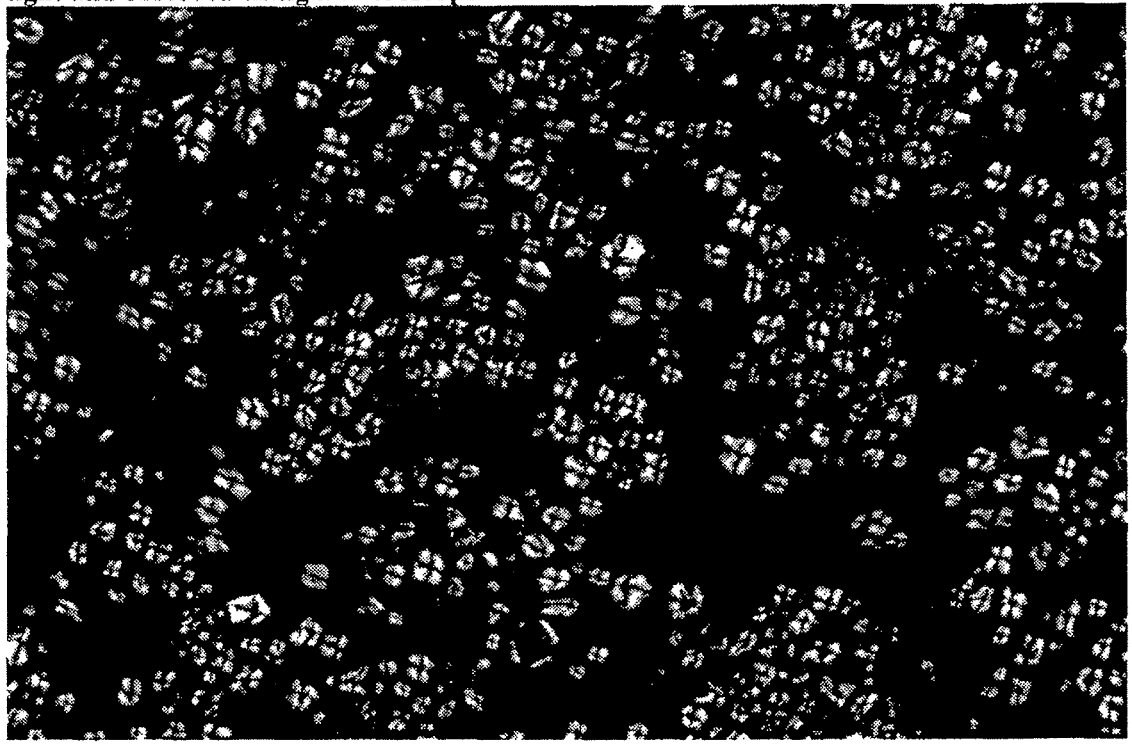
Figure 23:
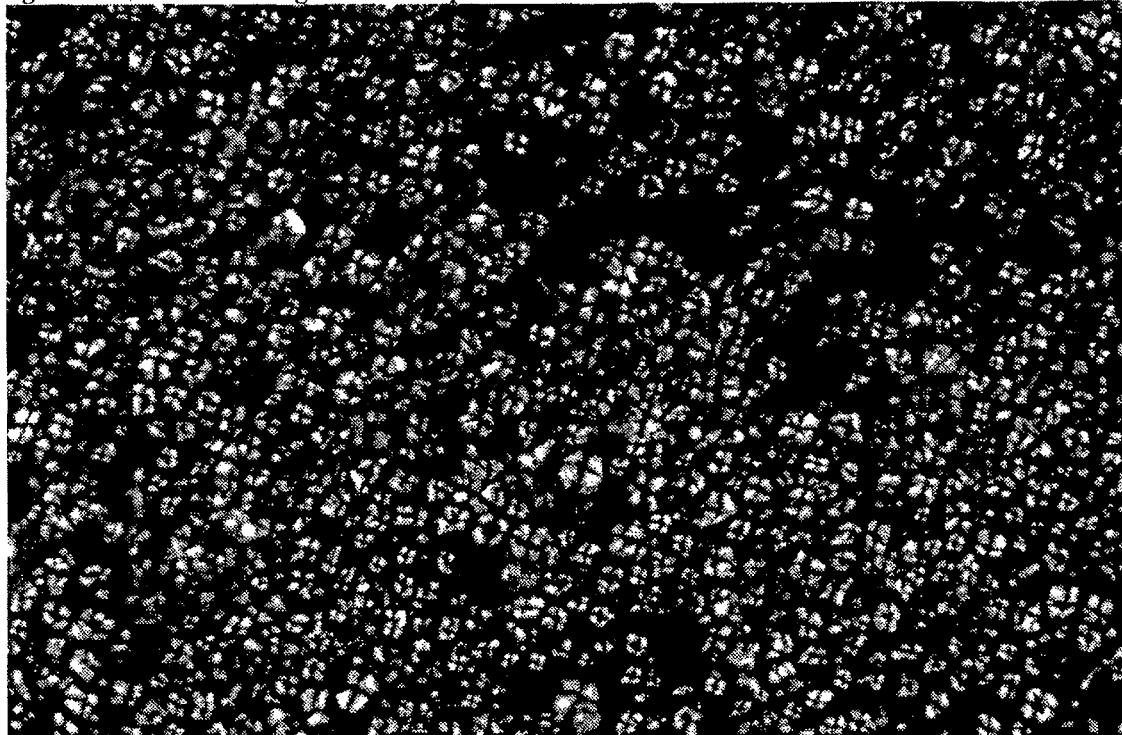

Native starch granules show birefringence or a typical Maltese cross when viewed in polarized light. When starch is heated in water, birefringence or Maltese cross in polarized light is lost by the end of starch gelatinization. FIGS. 22 and 23 show that Maltese crosses of starch granules are preserved when waxy starch has been processed using alcohol-alkaline treatment with two heating cycles and desolventized at 125° C. and 160° C., which indicates that the starch is non-pregelatinized.

Sedimentation volumes are used to measure the extent of inhibition of starch in the above-described study. A smaller un-sheared sedimentation volume indicates less swelling of cooked starch granules and a higher inhibition. A smaller change of sheared sedimentation volumes compared to un-sheared sedimentation volumes indicates a higher shear stability. By these standards, it was shown that the alcohol-alkaline treated samples 7629-68 before and after desolventization were very highly inhibited and shear stable. RVA profiles also showed that samples 7629-68 before and after desolventization were highly inhibited.

The micrographs of cooked starch in 1% NaCl before (FIGS. 18 and 20) and after shearing using a blender (FIGS. 19 and 21) at 25 Volts for 20 sec show no significant fragmentation of gelatinized granules.

Maltese crosses of starch granules are preserved when waxy starch has been processed using alcohol-alkaline treatment with two heating cycles and desolventization, which indicates that the starch is non-pregelatinized.

Starch Treatment Method C

In this method, starch is heated in an alcoholic medium in which sodium carbonate and citric acid had been introduced, wherein the sodium carbonate is essentially neutralized by the citric acid (thus forming sodium salts of citric acid in situ).

Waxy starch (307 g, 10.7% moisture) was added to 3 A ethanol (1177 g; 7.18% water) while stirring. Anhydrous sodium carbonate (7.585 g; 2.77% by weight based on dry starch) and 18.5 g 50% citric acid solution (3.37% by weight based on dry starch) were then added. The resulting slurry was transferred into a two liter high pressure stainless steel reactor equipped with agitation and controlled steam heating through its jacket. The slurry was heated in the reactor with agitation to 143° C. and held at that temperature for 60 minutes. After cooling to 25° C., the slurry was filtered through filter paper in a Buechner funnel to provide a wet cake of starch. The wet cake was crumbled onto a tray and left for several hours in a hood for several hours before being put into an oven, to allow much of the 3 A alcohol to evaporate. The starch (identified hereafter as "7629-70") was thereafter dried at 50° C. in a convection oven overnight and then ground and passed through a 100 mesh sieve.

Desolventization of the starch with steam was carried out by placing 3.5 kg deionized water in a steel container (7.2" diameter, 8.5" tall), heating the steel container in an oven at 125° C. for 1 hour, spreading 50 g of the treated starch on a 500 mesh sieve and placing it on a shelf directly on top of the steel container, and desolventizing the starch at 125° C. for 4 hours. The starch was then dried overnight in a 50° C. oven.

The starch obtained was characterized using the same procedures described previously for the starch produced using Starch Treatment Method B.

Results and Discussion (Starch Treatment Method C)

Table 6 shows the sedimentation volumes in 1% NaCl of inhibited starch made using one heating cycle with sodium carbonate and citric acid in alcohol before and after desolventization.

TABLE 6

Sedimentation Volumes (mL) and Fragmented Cooked Starch Granules after Shear in 1% NaCl solution

| | Sedimentation Volume (mL) | | Microscopy |
|---|---|---|---|
| Sample | Un-sheared | Sheared at 25 Volts | % Fragmented Granules |
| 7629-70 | 23 | 22.5 | 21 |
| 7629-70, desol 125° C. | 22.5 | 21.5 | 16 |

Table 7 shows the sedimentation volumes in purified water of inhibited starch made using one heating cycle with sodium carbonate and citric acid in alcohol before and after desolventization. The sedimentation volumes were higher than those observed in 1% NaCl solution.

TABLE 7

Sedimentation Volumes (mL) and Fragmented Cooked Starch Granules after Shear in Purified Water

| | Sedimentation Volume (mL) | | Microscopy |
|---|---|---|---|
| Sample | Un-sheared | Sheared at 35 Volts | % Fragmented Granules |
| 7629-70 | 25 | 30 | 17.6 |
| 7629-70, STM 125 C. | 26.5 | 30 | 18.3 |

Figure 24:
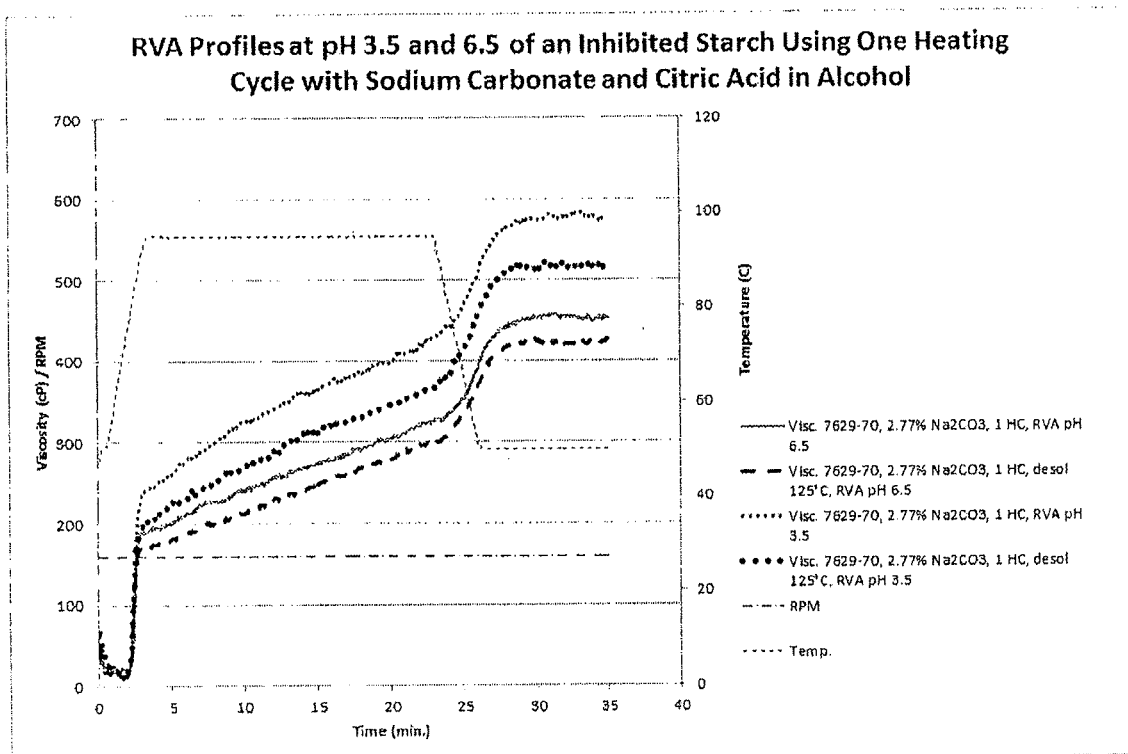

The RVA profiles at pH 3.5 and 6.5 of inhibited starch made using one heating cycle with sodium carbonate and citric acid in alcohol before and after desolventization are shown in FIG. 24.

FIG. 25 is a micrograph of starch cooked in 1% NaCl as prepared for measuring the un-sheared sedimentation volumes. FIG. 26 is a micrograph of starch cooked in 1% NaCl and then sheared using a blender as prepared for measuring the sheared sedimentation volumes.

What is claimed is:

1. An inhibited non-chemically modified non-pregelatinized granular starch that is highly inhibited, the inhibited non-chemically modified non-pregelatinized granular starch having:
   a continuing rise in viscosity without attaining a peak viscosity, wherein viscosity is measured by heating the starch in an amount of 5% to 6.3% dry solids basis in water having a pH of 3 at a temperature of 92° C. to 95° C., wherein the inhibited non-pregelatinized starch is not chemically modified;
   a specific sedimentation volume of no more than 18 mL/g, the specific sedimentation volume being the bulk volume occupied by swollen starch granules per mass unit of dry starch, when cooked using a Rapid Visco Analyzer under the following procedure:
   preparation of a slurry of 2.5% dry starch by weight in pH 6.5 phosphate buffer; 38 g total slurry;
   Rapid Visco Analyzer cook profile of 160 rpm, 20 min at 95° C., cool down to 50° C., total run 35 minutes, with water loss during the cook being accounted for by weighing before and after cooking
   transferring of cooked paste into a tared 30-mL centrifuge tube without dilution, recording the mass of paste transferred;
   centrifuging of cooked paste at 4000 rpm for 15 minutes in a centrifuge and determination of volume of swollen granular material after decanting supernatant; and
   determination of specific sedimentation volume in units of mL/q by the formula $$SSV = \frac{\text{mL sediment after centrifuging}}{\text{g paste in centrifuge tube} \times \% \text{ dry starch content in paste}};$$

and
   a retort stability exhibiting a positive or zero slope during a five minute hold at 120° C. when analysed under a retort simulation in a rheometer.

2. The inhibited non-chemically modified non-pregelatinized granular starch of claim 1, having an SSV in the range of 9 mL/g to 18 mL/g.

3. The inhibited non-chemically modified non-pregelatinized granular starch of claim 1, wherein the inhibited non-pregelatinized granular starch is in the form of granules and not less than 70% of the granules exhibit birefringence when viewed in polarized light.

4. The inhibited non-chemically modified non-pregelatinized granular starch of claim 3, wherein not less than 80% of the granules exhibit birefringence when viewed in polarized light.

5. The inhibited non-chemically modified non-pregelatinized granular starch of claim 3, wherein not less than 90% of the granules exhibit birefringence when viewed in polarized light.

6. The inhibited non-chemically modified non-pregelatinized granular starch of claim 1, having a whiteness index of at least 41.5.

7. The inhibited non-chemically modified non-pregelatinized granular starch of claim 1, having a whiteness index in the range of 41.5 to 50.9.

8. The inhibited non-chemically modified non-pregelatinized granular starch of claim 1, having a yellowness index of not more than 17.8.

9. The inhibited non-chemically modified non-pregelatinized granular starch of claim 1, having a yellowness index in the range of 14.8 to 17.8.

10. The inhibited non-chemically modified non-pregelatinized granular starch of claim 1, having a residual alcohol content of less than 0.1 weight %.

11. The inhibited non-chemically modified non-pregelatinized granular starch of claim 1, wherein the inhibited non-pregelatinized granular starch is in the form of a free-flowing, granular material.

12. The inhibited non-chemically modified non-pregelatinized granular starch of claim 1, wherein:
   the inhibited non-pregelatinized granular starch is in the form of a free-flowing granules and not less than 80% of the granules exhibit birefringence when viewed in polarized light;
   the inhibited non-pregelatinized granular starch has a specific sedimentation volume (SSV) of not more than 16 mL/g; and
   the inhibited non-pregelatinized starch has a whiteness index of at least 41.5 and a yellowness index of not more than 17.8.

13. A food product comprising an amount of an inhibited non-chemically modified non-pregelatinized granular starch in accordance with claim 1 which is 2 to 6% by weight of the food product.

14. A food product comprising an inhibited non-chemically modified non-pregelatinized granular starch in accordance with claim 1, the food product being in the form of a pie filling, a baby food, a tomato-based product, a gravy, a sauce, a soup, a pudding, a salad dressing, a yogurt, a sour cream, a cheese, a frozen dessert, a frozen dinner, or a dry mix.

* * * * *